(12) United States Patent
Thompson et al.

(10) Patent No.: US 7,377,495 B1
(45) Date of Patent: May 27, 2008

(54) TEMPERATURE SENSITIVE PRESSURE REGULATOR FOR CARBONATED BEVERAGE SYSTEMS

(75) Inventors: Scott M. Thompson, San Antonio, TX (US); Steven R. Christoffersen, San Antonio, TX (US); Samuel Durham, San Antonio, TX (US); David E. Green, San Antonio, TX (US)

(73) Assignee: Thompson Design Innovation, L.L.C., San Antonio, TX (US)

( * ) Notice: Subject to any disclaimer, the term of this patent is extended or adjusted under 35 U.S.C. 154(b) by 220 days.

(21) Appl. No.: 11/070,193

(22) Filed: Mar. 2, 2005

Related U.S. Application Data

(60) Provisional application No. 60/608,988, filed on Sep. 10, 2004, provisional application No. 60/549,828, filed on Mar. 3, 2004.

(51) Int. Cl.
*B01F 3/04* (2006.01)

(52) U.S. Cl. .................. 261/39.1; 261/43; 261/64.3; 261/DIG. 7

(58) Field of Classification Search ............... 261/39.1, 261/43, 46, 47, 55, 56, 61–63, 64.3, DIG. 7
See application file for complete search history.

(56) References Cited

U.S. PATENT DOCUMENTS

| | | | |
|---|---|---|---|
| 1,236,953 A | 8/1917 | Lewis | |
| 1,540,035 A | 6/1925 | Roesch | |
| 1,893,849 A | 1/1933 | Sullivan | |
| 2,199,661 A | 5/1940 | Gamble et al. | |
| 2,514,463 A | 7/1950 | Bayers | |
| 2,665,559 A | 1/1954 | Dexter | |
| 2,682,160 A | 6/1954 | Kromer | |
| 2,741,263 A | 4/1956 | Spencer | |
| 3,335,952 A | 8/1967 | Yingst et al. | |
| 3,552,726 A | 1/1971 | Kraft | |
| 3,608,779 A | 9/1971 | Cornelius | |
| 3,794,302 A | 2/1974 | Diener | |
| 3,843,049 A * | 10/1974 | Baysinger | 236/1 E |
| 3,917,162 A * | 11/1975 | Trotter et al. | 236/23 |
| 4,265,270 A | 5/1981 | Satoh | |
| 4,287,909 A | 9/1981 | Tompson et al. | |
| 4,632,275 A | 12/1986 | Parks | |
| 4,745,904 A | 5/1988 | Cagle | |
| 4,774,489 A * | 9/1988 | Kelly et al. | 337/314 |
| 4,818,444 A | 4/1989 | Hedderick et al. | |
| 4,869,396 A | 9/1989 | Horino et al. | |
| 5,178,799 A | 1/1993 | Brown et al. | |
| 5,518,666 A | 5/1996 | Plester et al. | |
| 5,806,550 A | 9/1998 | Frank | |
| 6,354,319 B1 | 3/2002 | Mooney | |
| 6,641,004 B2 | 11/2003 | Nielsen | |

FOREIGN PATENT DOCUMENTS

EP 0 636 407 A1 2/1995

* cited by examiner

*Primary Examiner*—Scott Bushey
(74) *Attorney, Agent, or Firm*—Cox Smith Matthews Incorporated

(57) ABSTRACT

A pressure regulator that regulates the pressure at which carbon dioxide is introduced to water in a carbonated beverage system based on the temperature of the water. The regulator may be capable of operating in a first mode in which the carbon dioxide pressure varies substantially linearly over a first water temperature range, and a second mode in which the carbon dioxide pressure is substantially constant over a second water temperature range. A first flow path having a relatively small gas flow capacity may serve as a pilot to control the gas flow through a second flow path having a larger gas flow capacity.

19 Claims, 38 Drawing Sheets

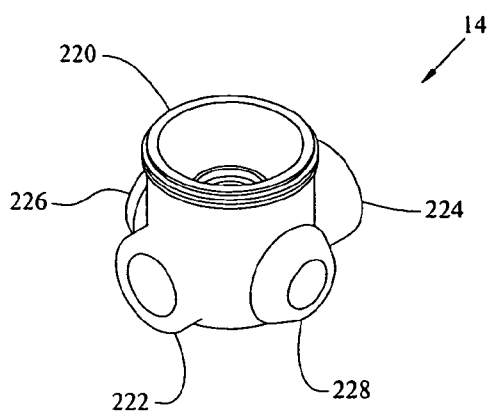
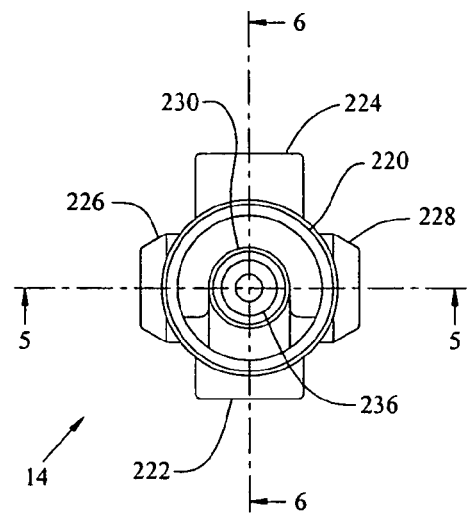
Fig. 3
Fig. 4
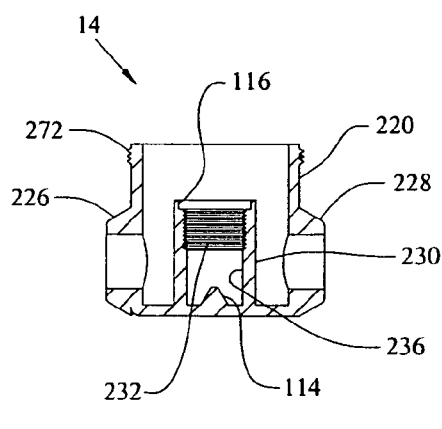
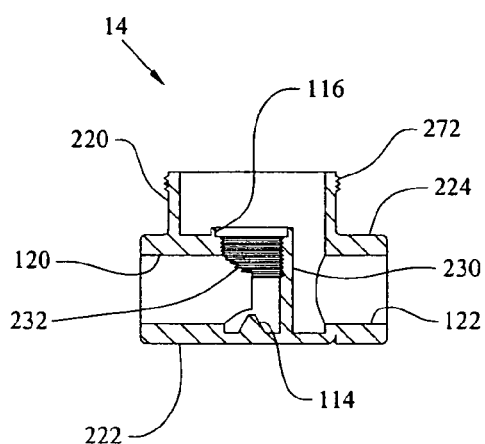
Fig. 5
Fig. 6

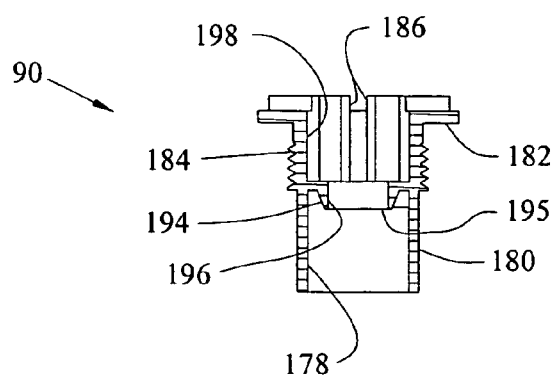
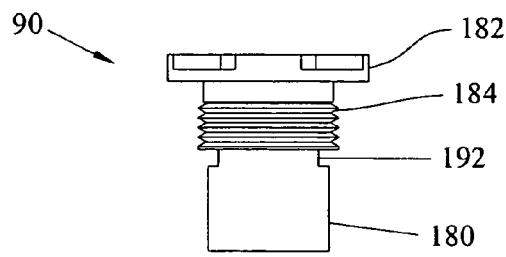
Fig. 22  Fig. 23
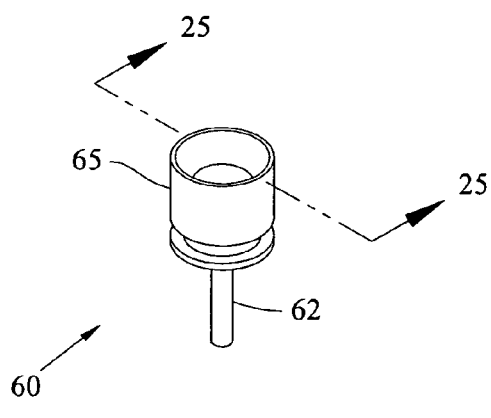
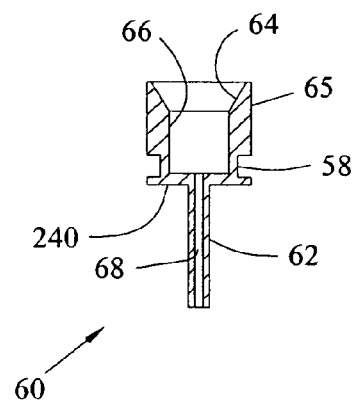
Fig. 24  Fig. 25

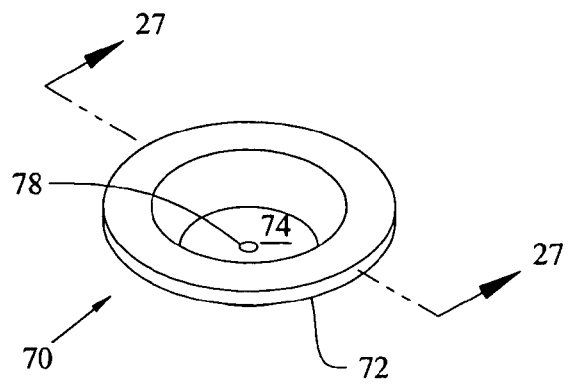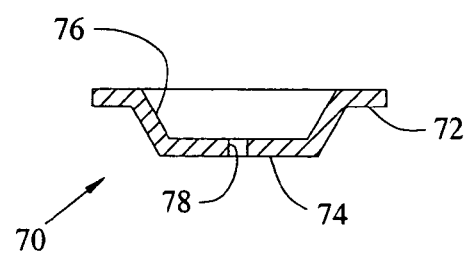
Fig. 26  Fig. 27
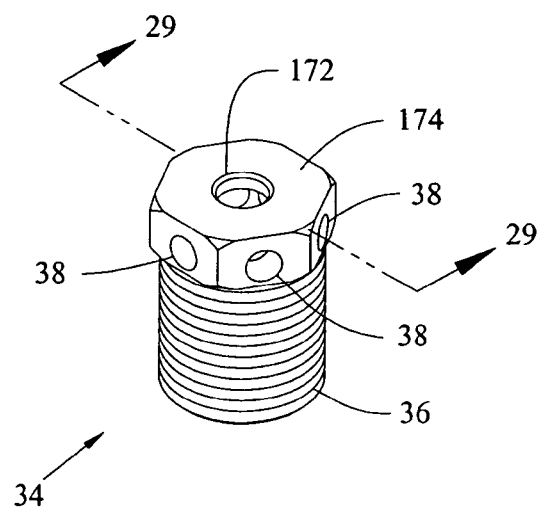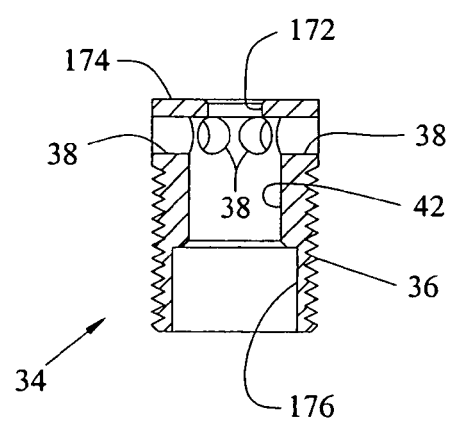
Fig. 28  Fig. 29

TEMPERATURE SENSITIVE PRESSURE REGULATOR FOR CARBONATED BEVERAGE SYSTEMS

CROSS-REFERENCE TO RELATED APPLICATIONS

This application claims the benefit of U.S. Provisional Patent Application No. 60/549,828 filed Mar. 3, 2004, and U.S. Provisional Patent Application No. 60/608,988 filed Sep. 10, 2004, the full disclosures of which are incorporated herein by reference.

BACKGROUND

1. Field

This application relates to the field of carbonated beverage systems, and more particularly to pressure regulators for controlling the pressure at which carbon dioxide is introduced into water in carbonated beverage systems.

2. Description of the Related Art

In the process of mixing carbon dioxide ($CO_2$) gas with water to make carbonated water for post-mix dispensing of soft drinks, the efficiency of dispersion of $CO_2$ gas into water is related to water temperature and pressure. It is desirable to achieve a consistent and repeatable level of $CO_2$ dispersion into the water as this system affects various aspects of a post-mix carbonated beverage such as cup carbonation, foam height, stratification, and taste. Carbonation levels that are too high create excessive foaming in the cup so that when a customer pours a drink, there is a less than optimal amount of drink in the cup after the foam settles. Carbonation levels that are too low cause a "flat" drink, and in many cases low carbonation causes inconsistent or "off" taste drinks.

Currently, there are two carbonation schemes commercially available:

(1) Ambient carbonation—typically utilized with ice-cooled dispensers.

Ice-cooled dispensers have an ice bin with an aluminum cold plate as the bottom of the bin. Syrup and water lines are cast into the aluminum plate. The ice in the ice bin keeps the aluminum plate cold, hence chilling the syrup concentrate and carbonated water passing through the cold plate lines. Historically, this type of dispenser has been designed as a cooling engine and dispense point only. Carbonation has historically been remote from the dispenser and ambient.

(2) Cold carbonation—typically utilized with counter-electric dispensers.

Counter-electric dispensers have a mechanical vapor-compression refrigeration unit with the evaporator coil immersed in a water bath. The vapor-compression refrigeration unit creates an ice bank within the water bath to grow on the evaporator coils. Syrup lines and water lines are routed within the water bath adjacent to the ice bank. Typically, a carbonation tank is also immersed in the water bath which is kept at a constant temperature by virtue of the presence of the adjacent ice.

Cold carbonation is currently the preferred process, because of the fact that the temperature controlled carbonation tank will give consistent carbonation levels because $CO_2$ pressure and water temperature can remain constant and repeatable.

The positive aspect of ambient (room temperature) carbonation is that it is not space constrained. Contrary to cold carbonation, which must currently fit within a counter electric dispenser package envelope, ambient carbonation is accomplished remote from the dispenser and can therefore be easily configured, as necessary, for a particular venue (in terms of peak period usage, total throughput, etc.). However, ambient carbonators typically installed in post-mix soft drink dispensing units are placed in varying locations, which means water temperature and ambient temperatures can vary from the extreme cold of northern states in winter time to the extreme heat of southern states in the summer. In the United States, between the major national soft drink companies and smaller regional soft drink companies, there are in excess of one million post-mix dispenser installations.

The current configuration of a standard ambient carbonator includes a tank, liquid level probe, electric motor driven pump, gas regulator and check valves. The gas regulator is a typical unit including a set screw, spring, diaphragm and valve seat. The regulator accepts input gas in the form of pressurized $CO_2$ and delivers it at a specified pressure to the tank. Typically, the regulated gas setting is somewhere in the range of about 105 psi to 120 psi. The regulator has the capability of one discrete output pressure setting. In order to change the setting, it is necessary for a technician to turn the adjustment screw either in a clockwise or counterclockwise manner which acts to increase or decrease spring compression, hence varying the force on the inlet gas valve seat.

With a discrete pressure regulator and a large network of service technicians, it is ineffective for a large company to effectively vary $CO_2$ pressure specifications based on water temperature because the temperature can change significantly either during the course of a day or also during the span of a year. With 400,000 or more dispenser locations for one large soft drink manufacturer alone, the task of assuring proper carbonation levels by way of discrete pressure settings is financially unfeasible. Therefore, the large soft drink companies elect to simply specify one $CO_2$ pressure which gives the best performance in an average location. This leaves installations with higher than average water temperature and lower than average water temperature slightly out of the optimal $CO_2$ to water ratio specification.

In the post-mix soft drink dispensing industry, it is desirable to vary the $CO_2$ pressure on an ambient carbonation tank so that carbonation level in the dispensed drink is consistent. The level at which $CO_2$ gas will disperse into solution in water is a function of the water temperature and the $CO_2$ gas pressure. Increased water temperature requires increased $CO_2$ pressure to maintain the same level of dissolved $CO_2$ gas in solution. In the soft drink industry, it is generally desirable to have approximately 5.25 volumes of $CO_2$ dissolved into 1 volume of water in the carbonation tank. With $CO_2$ gas pressure set at a constant pressure on the carbonation tank (which is the case with a standard pressure regulator), and considering the ranges of ambient water temperature typically encountered (from about 50° F. to 90° F., for example), it is possible to have a fluctuation of more than 2 volumes of $CO_2$ gas within that ambient water temperature range.

It is important for a soft drink company to achieve consistent performance in its post-mix dispensers. Carbonation level in the dispenser affects cup performance measures such as cup carbonation, foam height and stratification. Consistent quality of post-mix dispensed drinks is key to satisfying customers and gaining repeat business. Previous attempts to achieve such consistency have failed.

BRIEF DESCRIPTION OF THE DRAWINGS

FIG. 3 is a perspective view of the main regulator body of FIG. 1.

FIG. 4 is a top view of the main regulator body of FIG. 3.

FIG. 5 is a cross-sectional view taken in the direction of arrows 5-5 of FIG. 4.

FIG. 6 is a cross-sectional view taken in the direction of arrows 6-6 of FIG. 4.

FIG. 22 is a cross-sectional view of the orifice insert taken in the direction of arrows 22-22 of FIG. 19.

FIG. 23 is a front view of the orifice insert of FIG. 19.

FIG. 24 is a perspective view of the piston of FIG. 1.

FIG. 25 is a cross-sectional view of the piston taken in the direction of arrows 25-25 of FIG. 24.

FIG. 26 is a perspective view of the dual mode disk of FIG. 1.

FIG. 27 is a cross-sectional view of the dual mode disk taken in the direction of arrows 27-27 of FIG. 26.

FIG. 28 is a perspective view of the adjustment screw of FIG. 1.

FIG. 29 is a cross-sectional view of the adjustment screw taken in the direction of arrows 29-29 of FIG. 28.

DETAILED DESCRIPTION

I. Basic Embodiment

Figure 1:
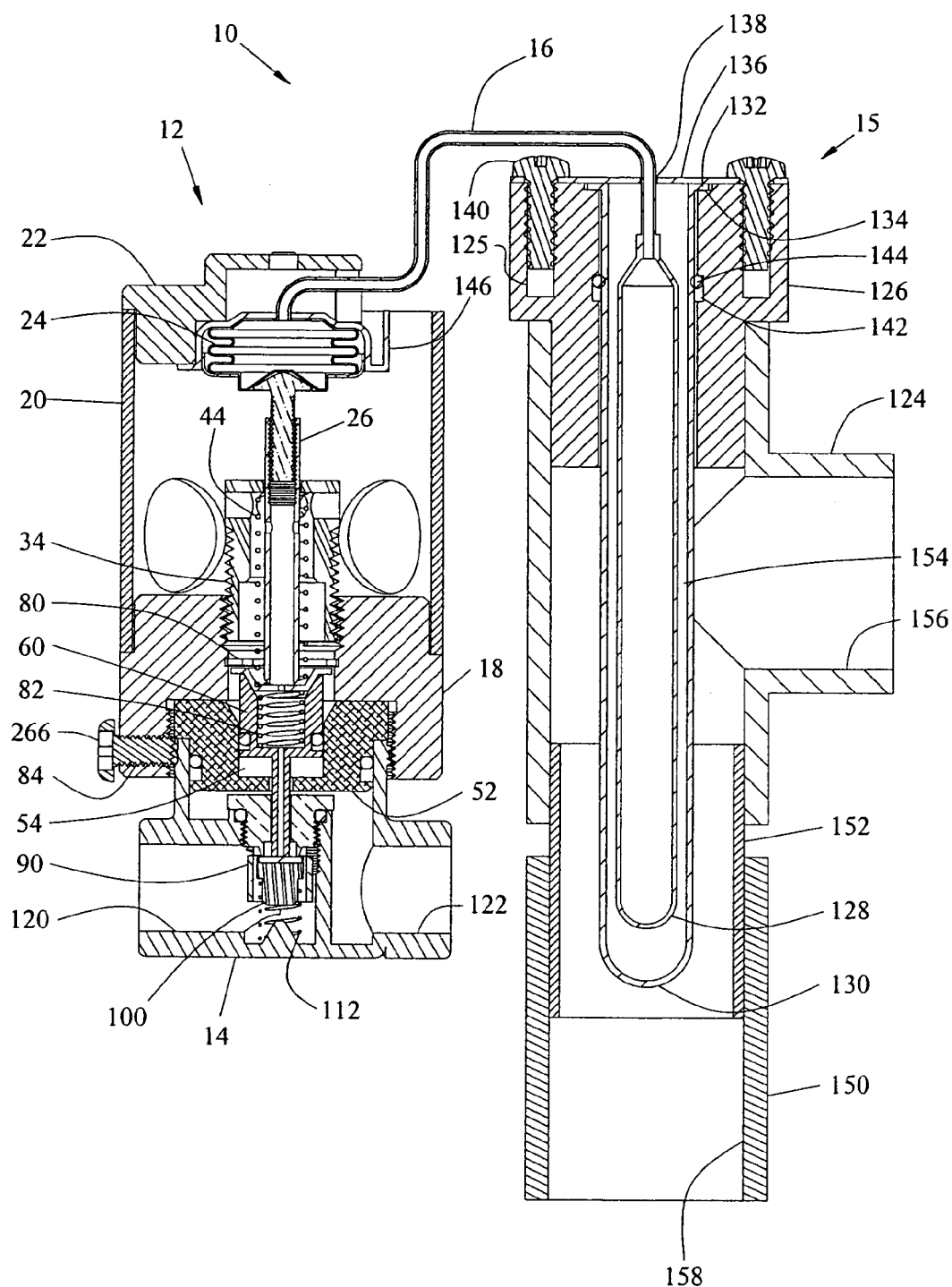
FIG. 1 is a cross-sectional view of a regulator assembly having a pressure regulator and a temperature sensor, the view being taken in the direction of arrows 1-1 of FIG. 35.
Figure 2:
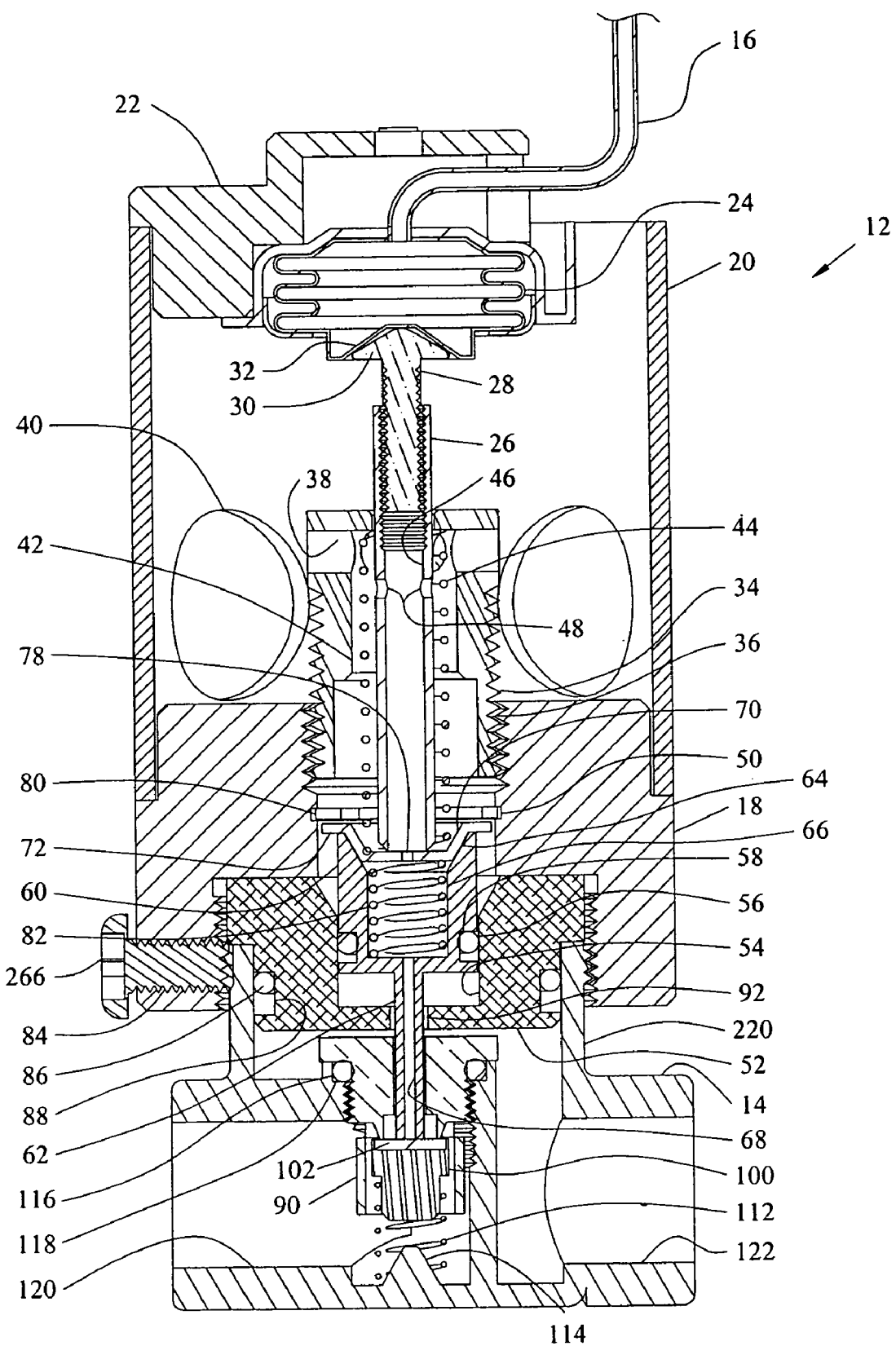
FIG. 2 is a cross-sectional view of the pressure regulator of FIG. 1.
Figure 12:
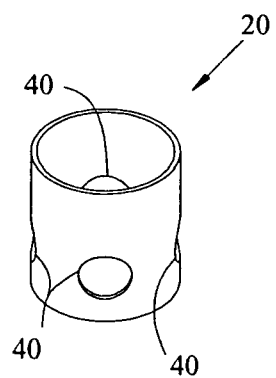
FIG. 12 is a perspective view of the body tube of FIG. 1.
Figure 35:
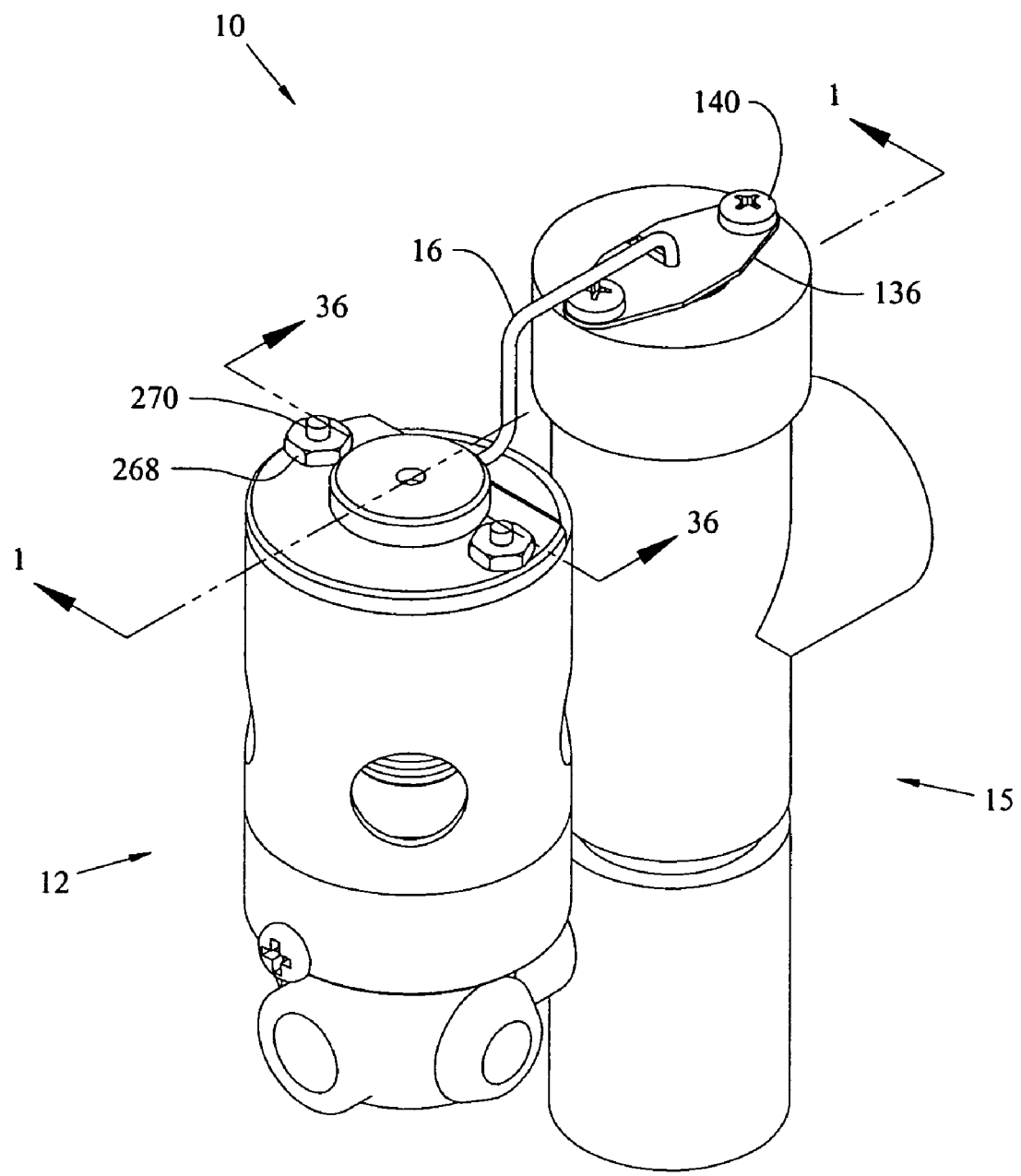
FIG. 35 is a perspective view of the regulator assembly of FIG. 1.

Referring to FIGS. 1 and 35, a regulator assembly 10 comprises a pressure regulator 12 and a temperature sensor 15 connected by a conduit 16, which may comprise a capillary tube. As shown in FIGS. 1 and 2, an orifice insert 90 is sealingly engaged within main regulator body 14 by an O-ring 118 positioned within recess 116. A poppet 100 is positioned within orifice insert 90 and is biased in the upward direction by a poppet spring 112. Poppet spring 112 is stabilized by protrusion 114. A bore body 52 is sealingly engaged with main regulator body 14 by an O-ring 86 positioned within groove 88. A piston 60 is disposed within a regulator bore 54 of bore body 52, and piston 60 is sealingly engaged in regulator bore 54 by an O-ring 56 disposed within a groove 58. Piston 60 has a stem 62 which traverses downward through a hole 92 in bore body 52 and further downward through orifice insert 90 into abutting engagement with poppet 100. A body sleeve 18 fits over bore body 52 and has a cross bore 84, which may be tapped for receiving a set screw 266 to secure body sleeve 18 to main regulator body 14. A body tube 20 is provided in engagement with body sleeve 18, and a bellows cap 22 is provided at the upper end of body tube 20. Piston 60 has a counterbore 66 for receiving a spring 82. Piston 60 also has a countersink 64 for receiving a dual mode disk 70. Spring 82 biases dual mode disk 70 in an upward direction. Body sleeve 18 has a groove 50 for receiving a retaining ring 80, such as a snap ring, which limits the upward travel of dual mode disk 70 for reasons to be described below. An adjustment screw 34 is threadably engaged with body sleeve 18 by means of threads 36. Adjustment screw 34 has a central bore 42 in which is disposed a push rod 26 having an adjustment screw 28 at its top end. Adjustment screw 28 has a head 30 which is engaged in a recess 32 of bellows 24. A trim spring 44 is disposed about push rod 26 within adjustment screw 34. Trim spring 44 engages the cross bore 38 at the top of adjustment screw 34 and engages dual mode disk 70 at its bottom end. A pressure relief passageway is formed by central bore 68 in piston stem 62, counterbore 66 of piston 60, hole 78 in dual mode disk 70, central bore 46 of push rod 26, cross bore 48 of push rod 26, and cross bore 38 of adjustment screw 34. Body tube 20 may have a plurality of access holes 40 (see also FIG. 12) which allow access to cross bore 38 of adjustment screw 34 for adjusting the depth of engagement between adjustment screw 34 and body sleeve 18, which adjusts the force provided by trim spring 44, which serves to raise or lower the pressure versus temperature curve (see FIG. 33) as desired. Access holes 40 also allow adjustment of the depth of engagement between adjustment screw 28 and push rod 26. Main regulator body 14 has an inlet 120 and an outlet 122.

Figure 16:
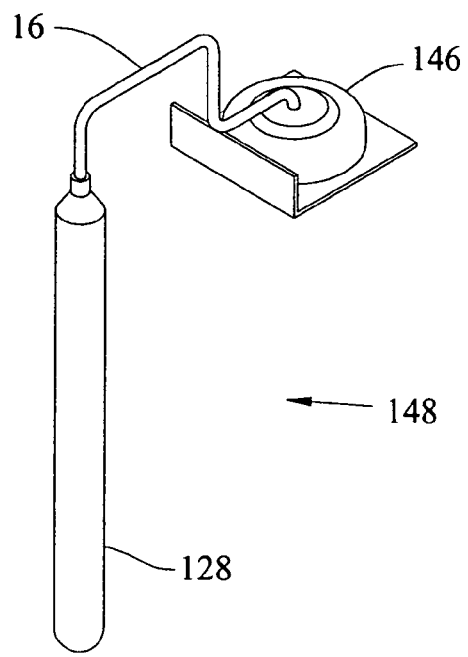
FIG. 16 is a perspective view of the power element of FIG. 1.

Referring again to FIG. 1, temperature sensor 15 has a T-coupling 124 having a fitting 126 attached to one leg and a nipple 152 attached to the other leg. A coupling 150 is attached to nipple 152. Fitting 126 has a recess 134 for receiving lip 132 of a cylinder 130. A bulb 128, which is a hollow body, containing a temperature sensitive fluid (not shown) is disposed within cylinder 130, which may be made of a thermally conductive metal such as copper. Bulb 128 is in fluid communication with conduit 16, which is in fluid communication with bellows 24. Cylinder 130, bulb 128, and conduit 16 are held in place by a plate 136, which is fastened to fitting 126 by screws 140 engaged in tapped holes 125 in fitting 126. Plate 136 has an opening 138 for receiving conduit 16. Fitting 126 has a recess 142 for receiving an O-ring 144 to seal the interface between cylinder 130 and fitting 126. A space 154 is thus formed between bulb 128 and cylinder 130. Space 154 may be filled with a thermally conductive substance (not shown), such as PM 8 thermal mastic paste available from Virginia KMP Corp., 4100 Platinum Way, Dallas, Tex. 75237. Of course, other suitable thermally conductive substances may also be used. Temperature sensor 15 is capable of receiving water (not shown) at inlet 156 which would then come into contact with cylinder 130 before exiting at outlet 158. Of course, persons reasonably skilled in the art will appreciate that the water flow direction could be reversed. As the water flows about cylinder 130, the thermally conductive nature of cylinder 130 and the thermally conductive substance in space 154 effectuate heat transfer between the water and the fluid inside bulb 128, which causes the temperature of the fluid inside bulb 128 to attain or closely approach the temperature of the water. Of course, bulb 128 could be placed in direct contact with the water, if desired, but direct contact is not required; rather, bulb 128 may simply be in sufficient proximity to the water to effectuate the desired heat transfer. Consequently, the fluid inside bulb 128 will tend to expand or contract in response to the temperature of the water, which in turn will serve to expand or contract bellows 24 by virtue of the fluid connection through conduit 16. Bellows assembly 146, conduit 16, and bulb 128 together constitute a power element 148 as depicted in FIG. 16. A commercially available and inexpensive power element from Invensys Appliance Controls ("Invensys"), 191 East North Avenue, Carol Stream, Ill. 60188, having part number RAS-16673 is a suitable form for power element 148.

As shown in FIG. 3, main regulator body 14 comprises a barrel 220, an inlet port 222, an outlet port 224, a first auxiliary port 226, and a second auxiliary port 228. As shown in FIGS. 4-6, main regulator body 14 has an internal fitting 230 with a chamber 236 and threads 232 for receiving orifice insert 90. A recess 116 is provided in fitting 230 for accommodating an O-ring 118 (see FIG. 2) to seal the interface between orifice insert 90 and fitting 230. Carbon dioxide ($CO_2$) enters at inlet 120 and exits at outlet 122 as described further below. First and second auxiliary ports 226 and 228 are provided for connection to auxiliary devices, such as pressure gauges (not shown).

Figure 7:
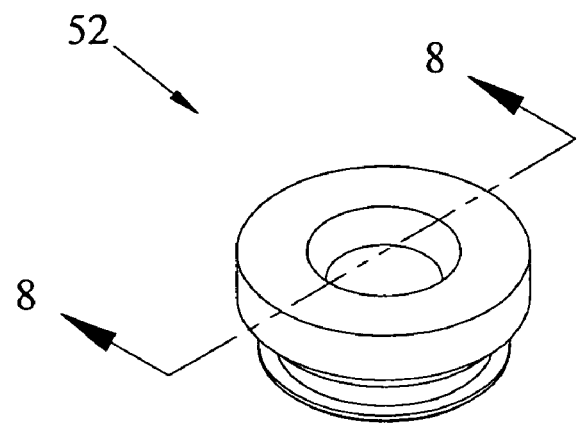
FIG. 7 is a perspective view of the bore body of FIG. 1.
Figure 8:
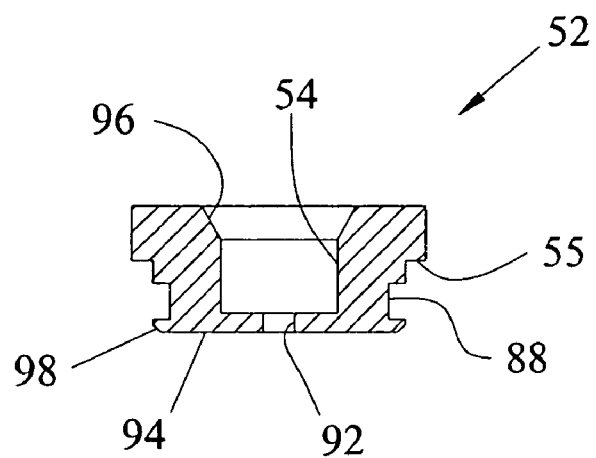
FIG. 8 is a cross-sectional view of the bore body taken in the direction of arrows 8-8 of FIG. 7.

As shown in FIGS. 7 and 8, bore body 52 has an internal passageway comprising countersink 96, regulator bore 54, and hole 92. Bore body 52 has a shoulder 55 for engagement with barrel 220 of main regulator body 14 (see FIG. 2). Bore body 52 has a groove 88 for receiving an O-ring 86 (see FIG. 2). A chamfer 98 is provided on bottom 94 of bore body 52 to assist in the insertion of bore body 52 into barrel 220 of main regulator body 14.

Figure 9:
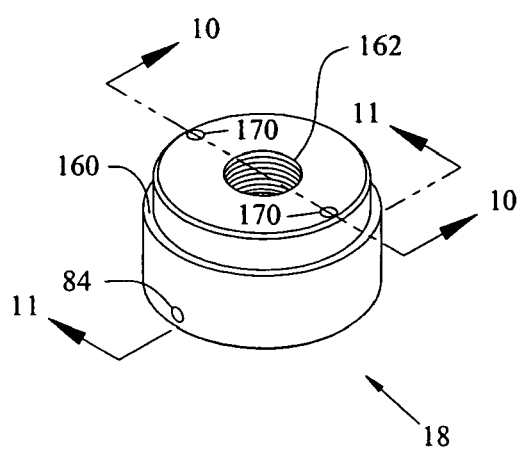
FIG. 9 is a perspective view of the body sleeve of FIG. 1.
Figure 10:
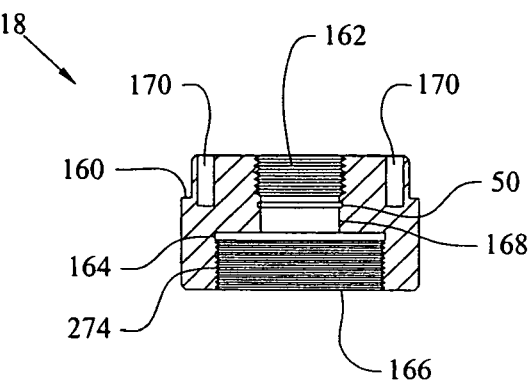
FIG. 10 is a cross-sectional view of the body sleeve taken in the direction of arrows 10-10 of FIG. 9.
Figure 11:
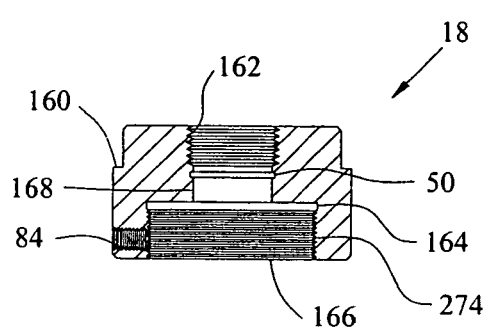
FIG. 11 is a cross-sectional view of the body sleeve taken in the direction of arrows 11-11 of FIG. 9.
Figure 36:
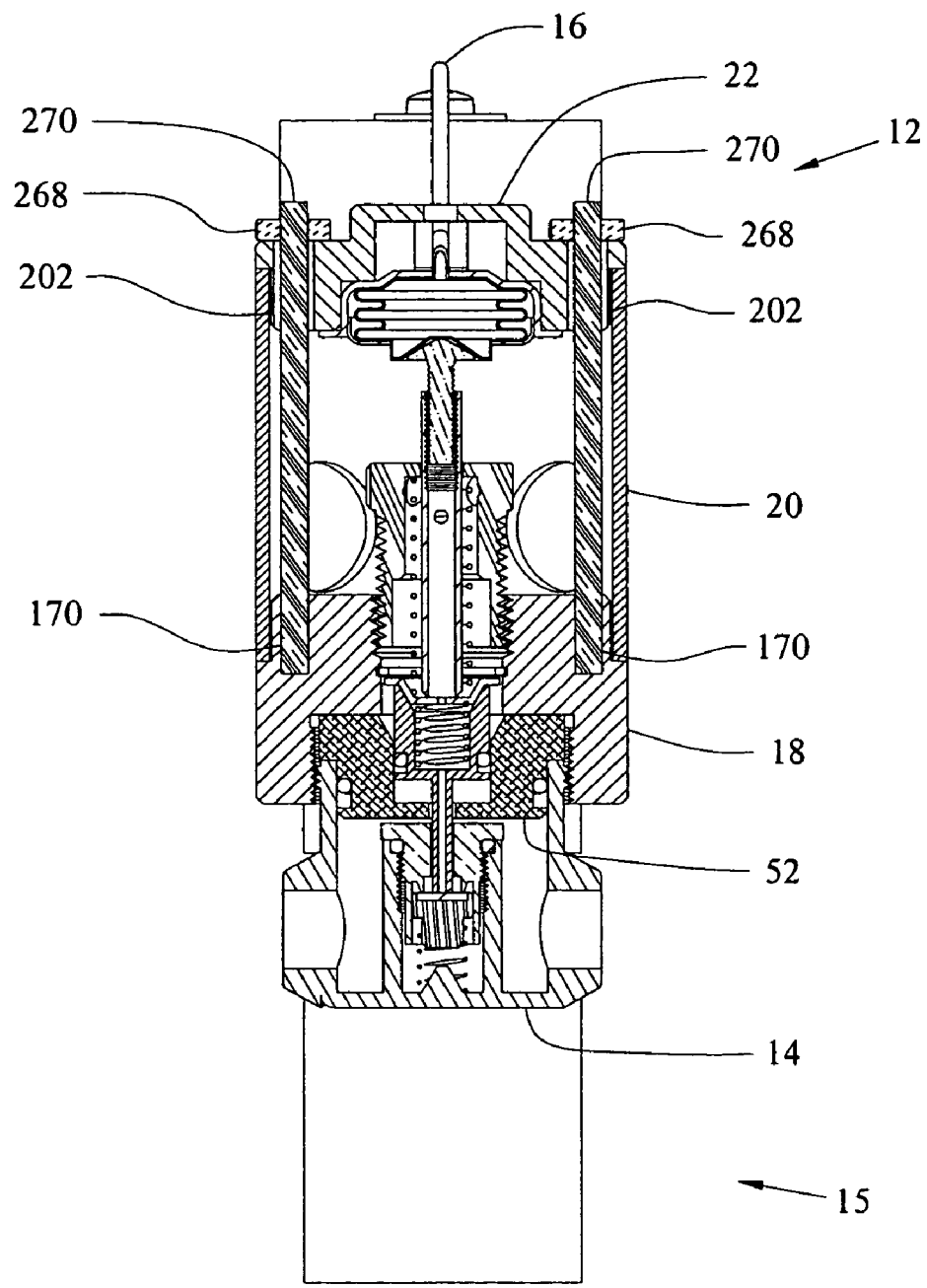
FIG. 36 is a cross-sectional view of the regulator assembly of FIG. 1 taken in the direction of arrows 36-36 of FIG. 35.

As shown in FIGS. 9-11, body sleeve 18 has a shoulder 160 for engagement with body tube 20 (see FIG. 2). Body sleeve 18 also has a bore 166 for receiving bore body 52 (see FIG. 2). The upper end of bore 168 is provided with threads 162 for engagement with threads 36 of adjustment screw 34 (see FIG. 2). A pair of tapped holes 170 are provided in body sleeve 18 for receiving a pair of tie rods 270 (see FIGS. 35 and 36) which are engaged at their upper ends in holes 202 of bellows cap 22 (see FIGS. 13 and 14) for holding bellows cap 22, body tube 20, and body sleeve 18 together. As shown in FIGS. 35 and 36, tie rods 270 are secured at their upper ends via nuts 268. Body sleeve 18 may be provided with a groove 164 to accommodate an additional O-ring (not shown) for added sealing capability between body sleeve 18 and bore body 52, if desired.

Figure 13:
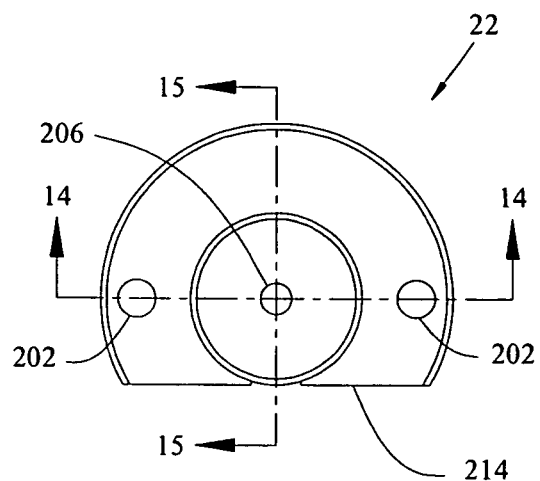
FIG. 13 is a top view of the bellows cap of FIG. 1.
Figure 14:
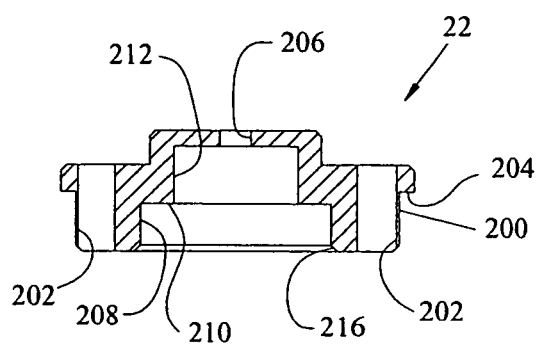
FIG. 14 is a cross-sectional view of the bellows cap taken in the direction of arrows 14-14 of FIG. 13.
Figure 15:
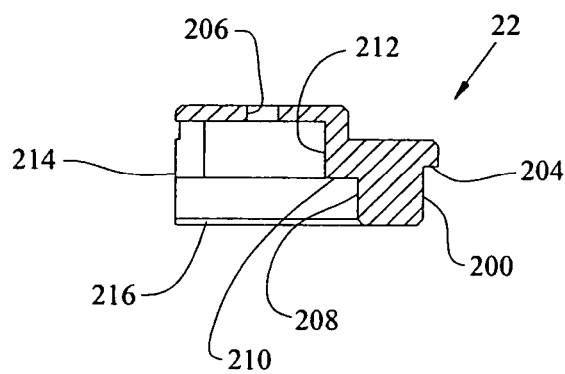
FIG. 15 is a cross-sectional view of the bellows cap taken in the direction of arrows 15-15 of FIG. 13.

As shown in FIGS. 13-15, bellows cap 22 has an inner wall 208 and shoulder 210 for engagement with bellows assembly 146 (see FIG. 1). A chamfer 216 is provided for ease of engagement of bellows cap 22 with bellows assembly 146. A mounting hole 206 is provided in the top of bellows cap 22 and two fastener holes 202 are provided for receiving tie rods 270 as discussed above for connection to body sleeve 18. Bellows cap 22 has an outer surface 200 and a shoulder 204 for abutting engagement with body tube 20 (see FIG. 2). Bellows cap 22 also has a cavity 212 and truncated side 214 for accommodating conduit 16 (see FIG. 2).

Figure 17:
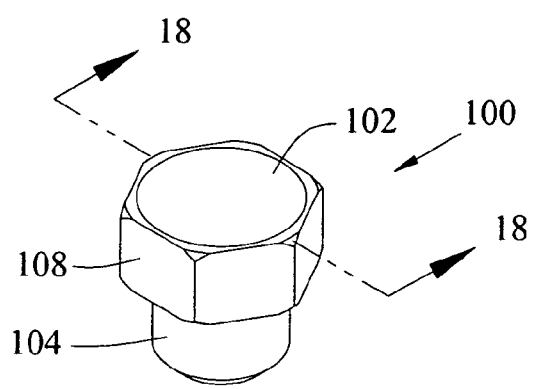
FIG. 17 is a perspective view of the poppet of FIG. 1
Figure 18:
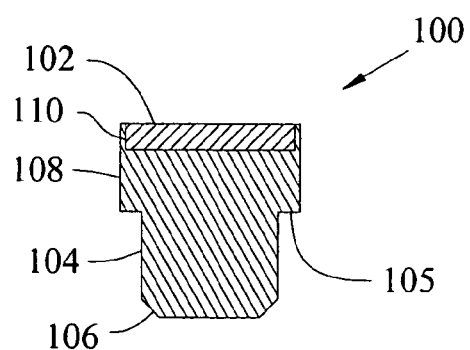
FIG. 18 is a cross-sectional view of the poppet taken in the direction of arrows 18-18 of FIG. 17.
Figure 19:
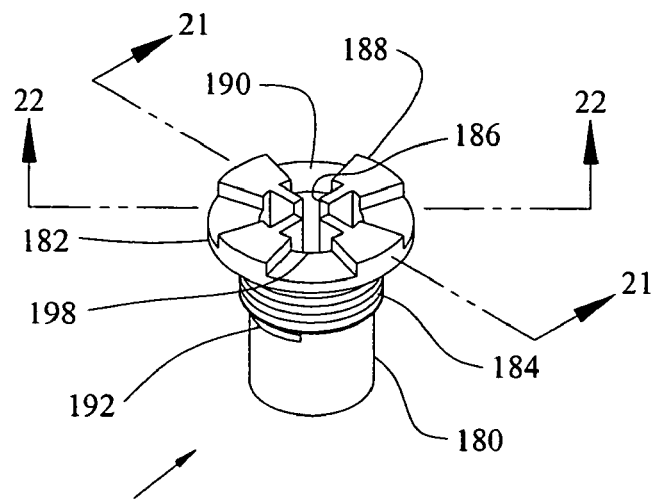
FIG. 19 is a perspective view of the orifice insert of FIG. 1.
Figure 20:
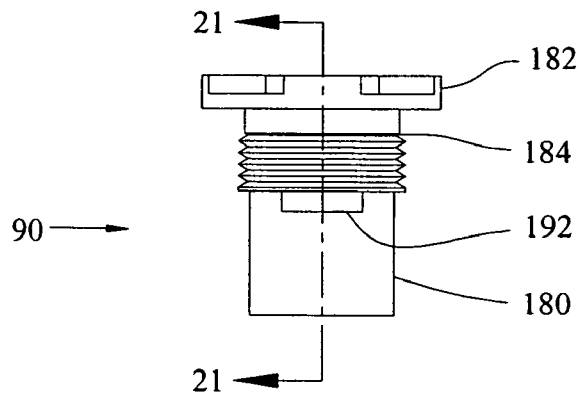
FIG. 20 is a side view of the orifice insert of FIG. 19.
Figure 21:
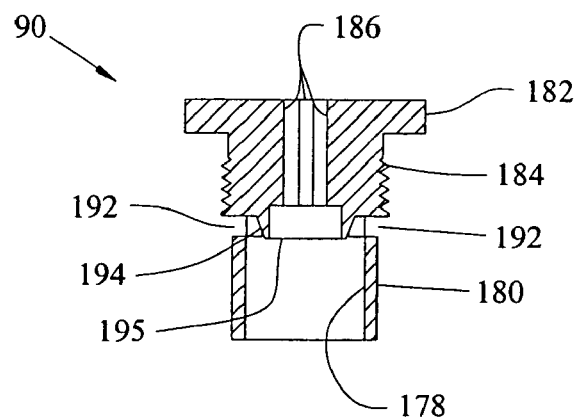
FIG. 21 is a cross-sectional view of the orifice insert taken in the direction of arrows 21-21 of FIGS. 19 and 20.

As shown in FIGS. 17-18, poppet 100 may comprise a head 108 having a recess 110 for receiving a pad 102. Shank 104 of poppet 100 may have a chamfer 106 for ease of insertion into poppet spring 112 (see FIG. 2). Pad 102 may be a resilient material, such as rubber, for purposes described further below. Poppet 100 has a shoulder 105 for engagement with poppet spring 112 (see FIG. 2).

Referring to FIGS. 19-23, orifice insert 90 may comprise a castellated head 182 having a plurality of protuberances 188 separated by spaces 190. A central passageway is formed by bore 178, passage 196, and passage 198. A skirt 180 extends from head 182 and has threads 184 at its upper end with a pair of slots 192 below threads 184. Slots 192 provide additional passageways for $CO_2$ gas to enter bore 178, which reduces dynamic pressure losses and thereby improves the efficiency of the regulator 12. Spaces 190 provide additional area for flow of $CO_2$ gas through the regulator 12 and also reduce the amount of material (e.g., plastic) required to produce orifice insert 90. A plurality of ribs 186 projects inwardly into passage 198 from protuberances 188. Ribs 186 are provided to stabilize and centrally align stem 62 of piston 60 within orifice insert 90 (see FIG. 2) while allowing sliding movement of stem 62 with respect to orifice insert 90. A rim 194 defines passage 196, and rim 194 has a sealing surface 195 for engagement with pad 102 of poppet 100 (see FIG. 2). Surface 195, rim 194, and passage 196 thus form an orifice which is capable of being opened and closed in cooperation with pad 102 of poppet 100 as described further below.

Referring to FIGS. 24-27, piston 60 has a countersink 64 for receiving dual mode disk 70. As discussed above, piston 60 has a groove 58 for receiving an O-ring 56 for sealing engagement with regulator bore 54 of bore body 52 (see FIG. 2). Stem 62 of piston 60 has a central bore 68 which communicates with counterbore 66 which is formed in main piston body 65. Piston 60 has a face 240 on which the $CO_2$ gas may act as described further below. Dual mode disk 70 has a shoulder 72 for resting atop piston 60. The bottom 74 of dual mode disk 70 has a hole 78 which communicates with recess 76.

Referring to FIGS. 28-29, adjustment screw 34 may have a hexagonal head 174 having a plurality of cross bores 38. Threads 36 are provided for engagement with mating threads in body sleeve 18 as shown in FIG. 2. A hole 172 is provided for receiving push rod 26 (see FIG. 2). A central passageway is formed by hole 172, central bore 42, and end bore 176.

Figure 34:
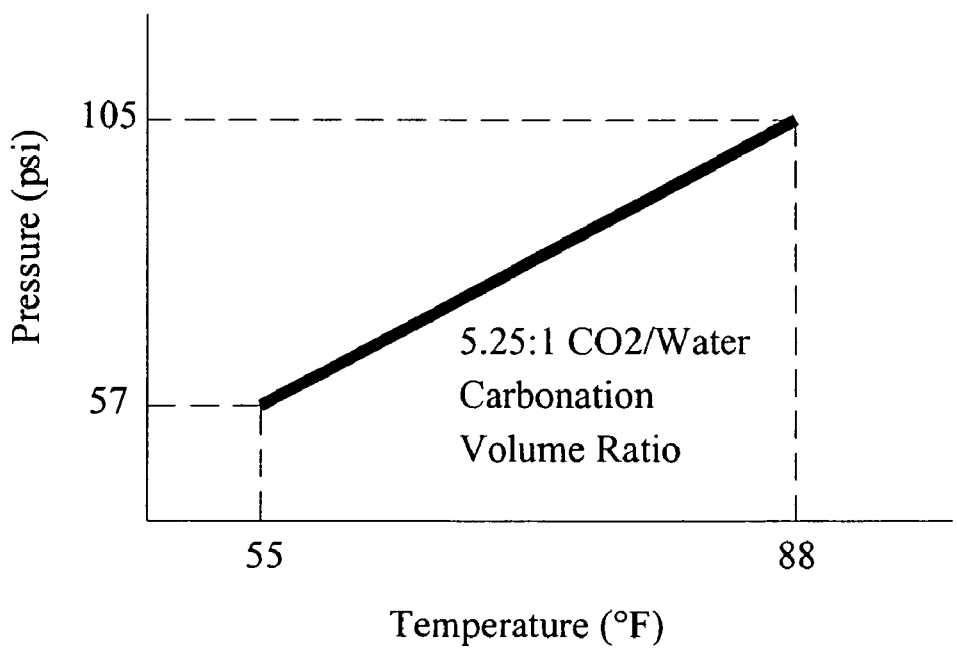
FIG. 34 is a pressure versus temperature graph for a standard carbonation volume ratio of 5.25:1.0 $CO_2$/water.

Having thus described an embodiment of regulator assembly 10, the operation thereof will now be described with primary reference to FIGS. 30, 31, and 32, which depict pressure regulator 12 in three different modes of operation. As described further below, pressure regulator 12 is capable of precisely controlling the pressure at which $CO_2$ gas is introduced into the water of a post-mix carbonated beverage system in order to maintain a desired volume ratio of $CO_2$ to water over a wide range of ambient temperatures. Typically, the desired volume ratio of $CO_2$ to water is 5.25 to 1, that is, 5.25 volumes of $CO_2$ dissolved into each 1.0 volume of water. As is known in the art, the solubility of $CO_2$ in water varies with the temperature of the water and the pressure of the $CO_2$ gas. Accordingly, as the temperature of the water changes, the pressure at which $CO_2$ is introduced into the water must change by a precise amount if the desired volume ratio is to be maintained. As is known in the art, for a given $CO_2$/water volume ratio, the relationship between water temperature and $CO_2$ pressure is substantially linear as shown in FIG. 34. However, previous attempts in the art have failed to achieve the desired result of a constant volume ratio of $CO_2$ to water over a wide range of operating temperatures, which is desirable for reasons relating to cup carbonation, foam height, stratification, and taste as discussed above.

Figure 33:
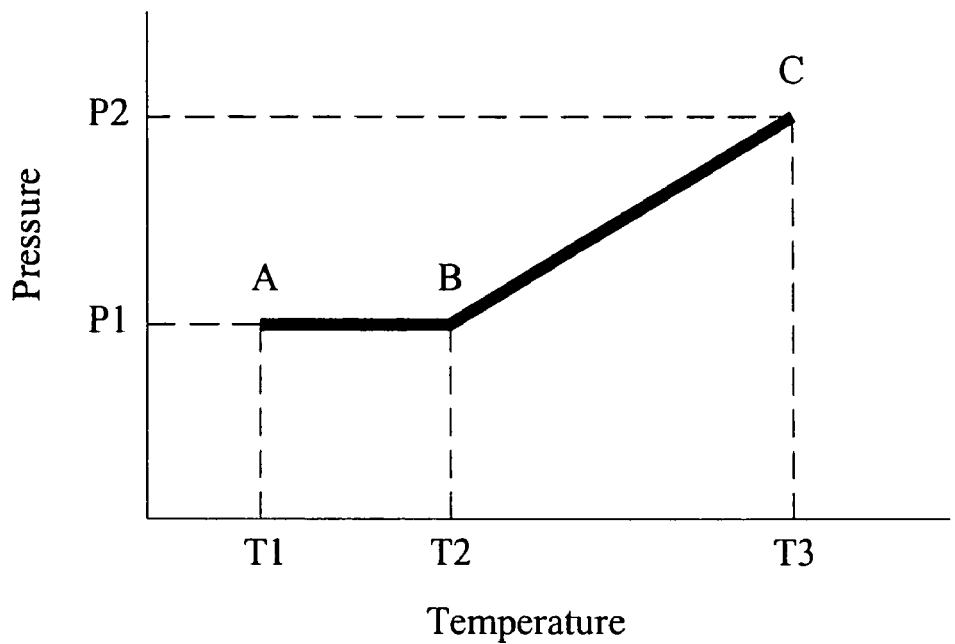
FIG. 33 is a pressure versus temperature graph for a pressure regulator.

Additionally, as the water temperature (and therefore the $CO_2$ pressure) decreases, at some point along the curve the pressure will be low enough to produce undesirably low flow rate performance at the dispensing unit. Typically, the need for sufficient flow rate performance at the dispensing unit outweighs the desire for a constant carbonation level in a lower temperature range. Therefore, the present apparatus is designed to perform in accordance with a segmented pressure versus temperature curve having a plurality of slopes such as that shown in FIG. 33 in order to maintain sufficient pressure in a lower temperature range. As shown in FIG. 33, if the water temperature is between $T_2$ and $T_3$, pressure regulator 12 regulates the $CO_2$ pressure according to segment BC of the curve, which may follow a predetermined carbonation level, such as 5.25 $CO_2$/water volume ratio, for example. However, if the water temperature is below $T_2$, pressure regulator 12 maintains the $CO_2$ pressure at a constant pressure $P_1$ along segment AB of the curve. For a standard 5.25 $CO_2$/water volume ratio, a suitable value for $P_1$ is about 70 psi, and a suitable value for $T_2$ is about 65° F. Persons of skill in the art will recognize that the particular carbonation level and the pressure and temperature values for breakpoint B may be selected at any desirable values, and the foregoing values are merely exemplary and not limiting to the present invention.

Figure 30:
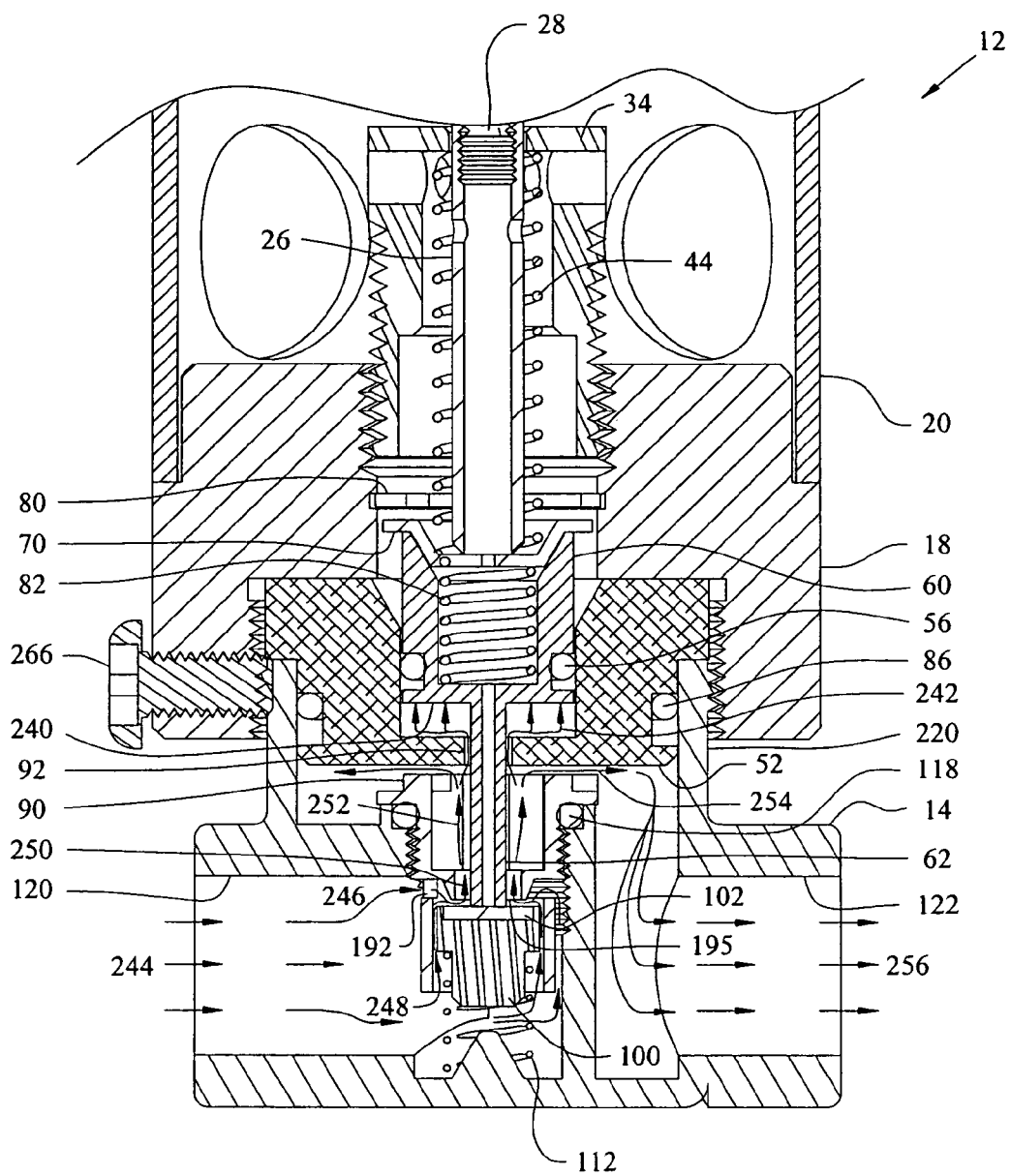
FIG. 30 is a cross-sectional view of a portion of the pressure regulator of FIG. 1 shown in a first operating condition.
Figure 37:
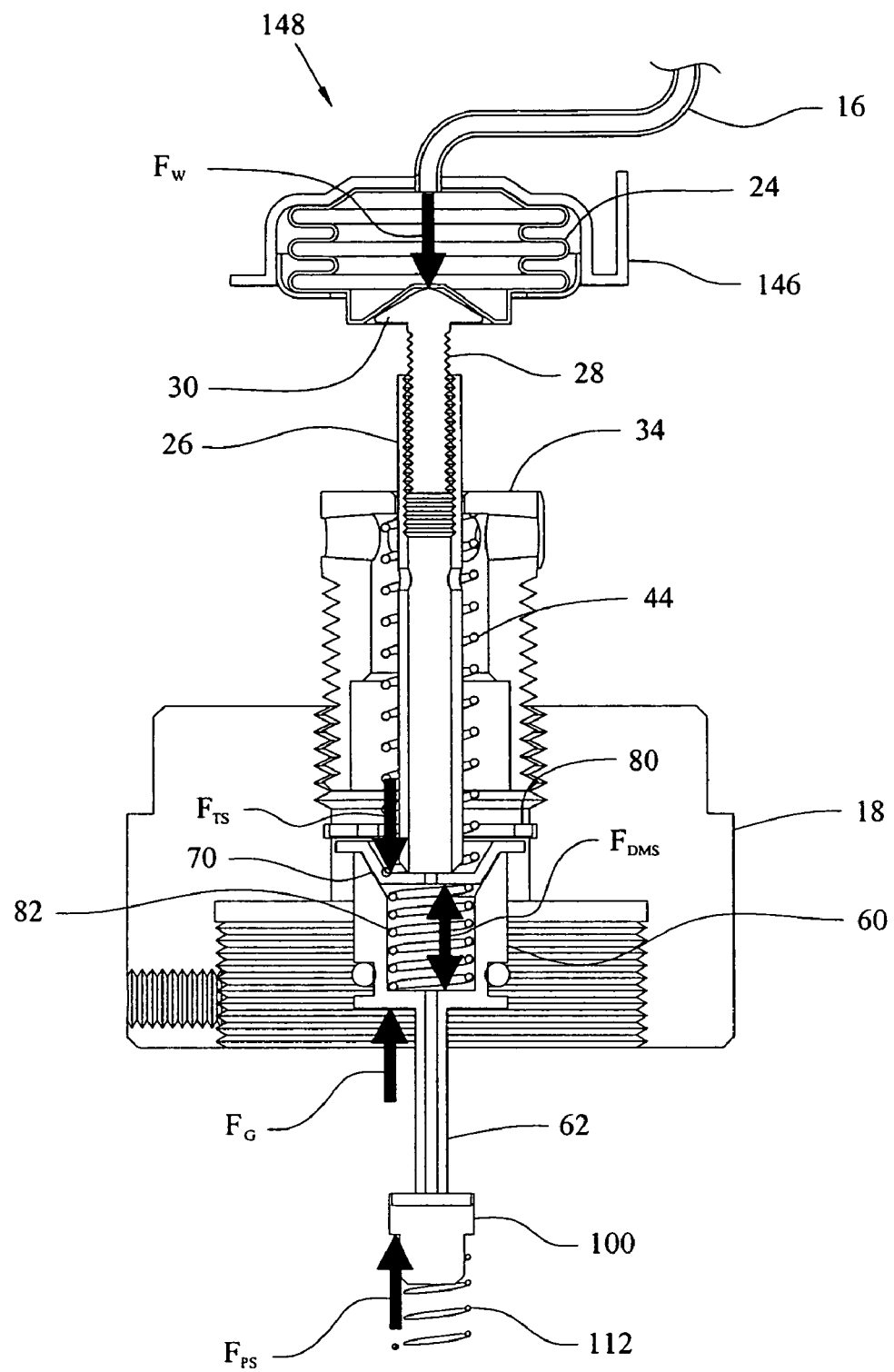
FIG. 37 is a schematic view illustrating the various forces acting on the piston of FIG. 1.
Figure 38:
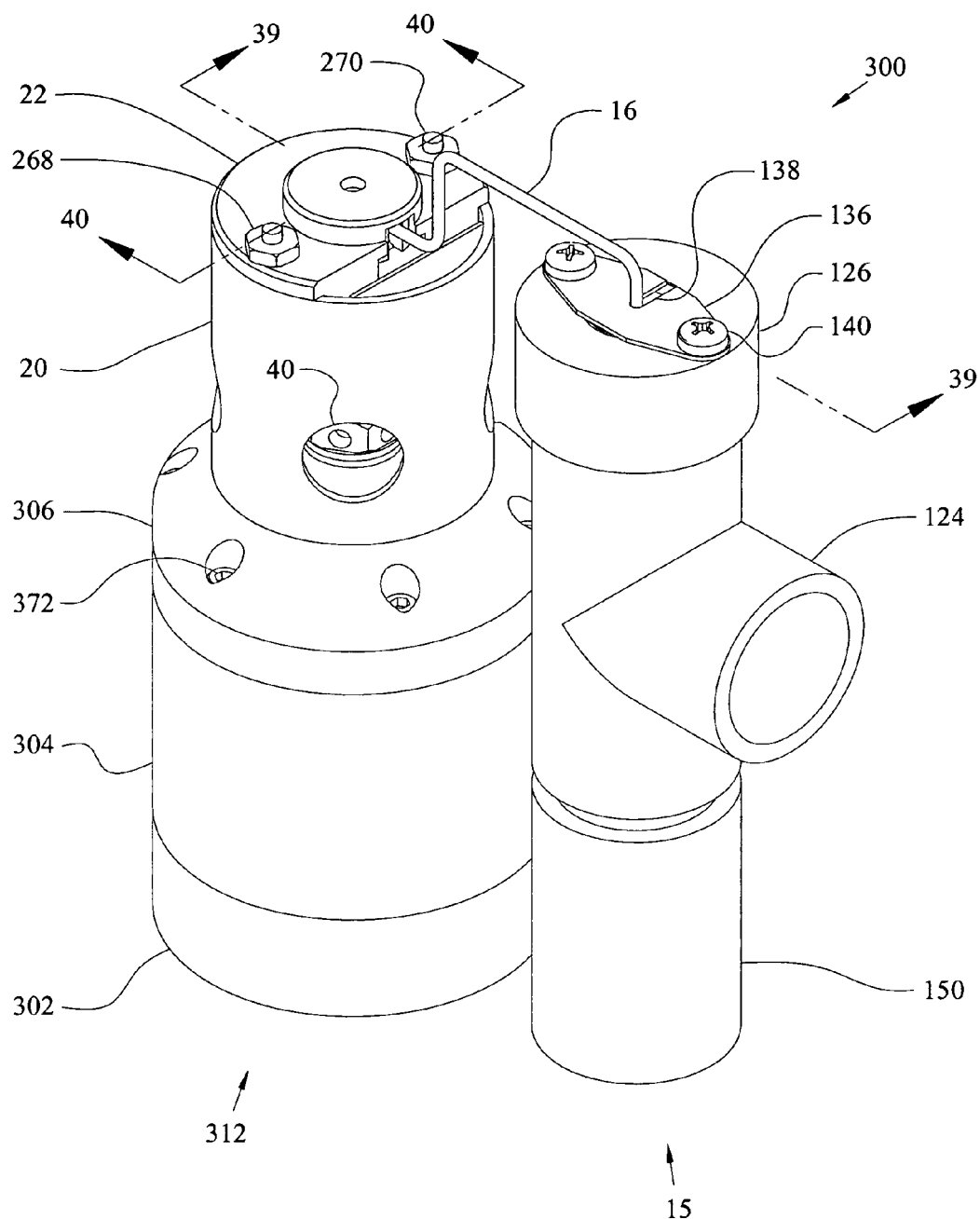
FIG. 38 is a perspective view of another pressure regulator assembly.

Referring to FIG. 30, pressure regulator 12 is shown in a first operating condition which corresponds to segment BC of the pressure versus temperature curve in FIG. 33. In this first operating condition, and referring further to FIG. 37, the combination of the force $F_W$ generated by power element 148 (see FIG. 16) due to the relatively higher temperature of the water (which is transmitted to piston 60 from bellows 24 through adjustment screw 28, push rod 26, and dual mode disk 70) plus the force $F_{TS}$ of trim spring 44 is greater than the force $F_{DMS}$ generated by dual mode spring 82. Thus, dual mode disk 70 is seated against piston 60 and is not engaged with retaining ring 80. In this condition, the downward forces $F_W$ and $F_{TS}$ acting on piston 60 are balanced by a combination of upward forces, namely, a force $F_G$ due to the pressure of the $CO_2$ gas acting on face 240 of piston 60 as indicated by arrows 242 and a force $F_{PS}$ generated by poppet spring 112 which is transmitted to stem 62 of piston 60 through poppet 100. The force balance in this condition is such that stem 62 has depressed pad 102 of poppet 100 out of engagement with sealing face 195 of orifice insert 90, and therefore $CO_2$ gas is allowed to flow through main regulator body 14. The $CO_2$ gas flows from inlet 120 as indicated by arrows 244, through slots 192 of orifice insert 90 as indicated by arrows 246, upward and around poppet 100 as indicated by arrows 248, upward through orifice insert 90 as indicated by arrows 250 and 252, and upward through hole 92 in bore body 52 to act on surface 240 of piston 60 as indicated by arrows 242. O-ring 56 prevents the $CO_2$ gas from traveling further upward around piston 60. The $CO_2$ gas also flows out from the top of orifice insert 90 as indicated by arrow 254 and exits through outlet 122 as indicated by arrows 256. A suitable hose or tube (not shown) would be connected to outlet 122 for introduction of the $CO_2$ gas into the water in a carbonator (not shown).

Figure 31:
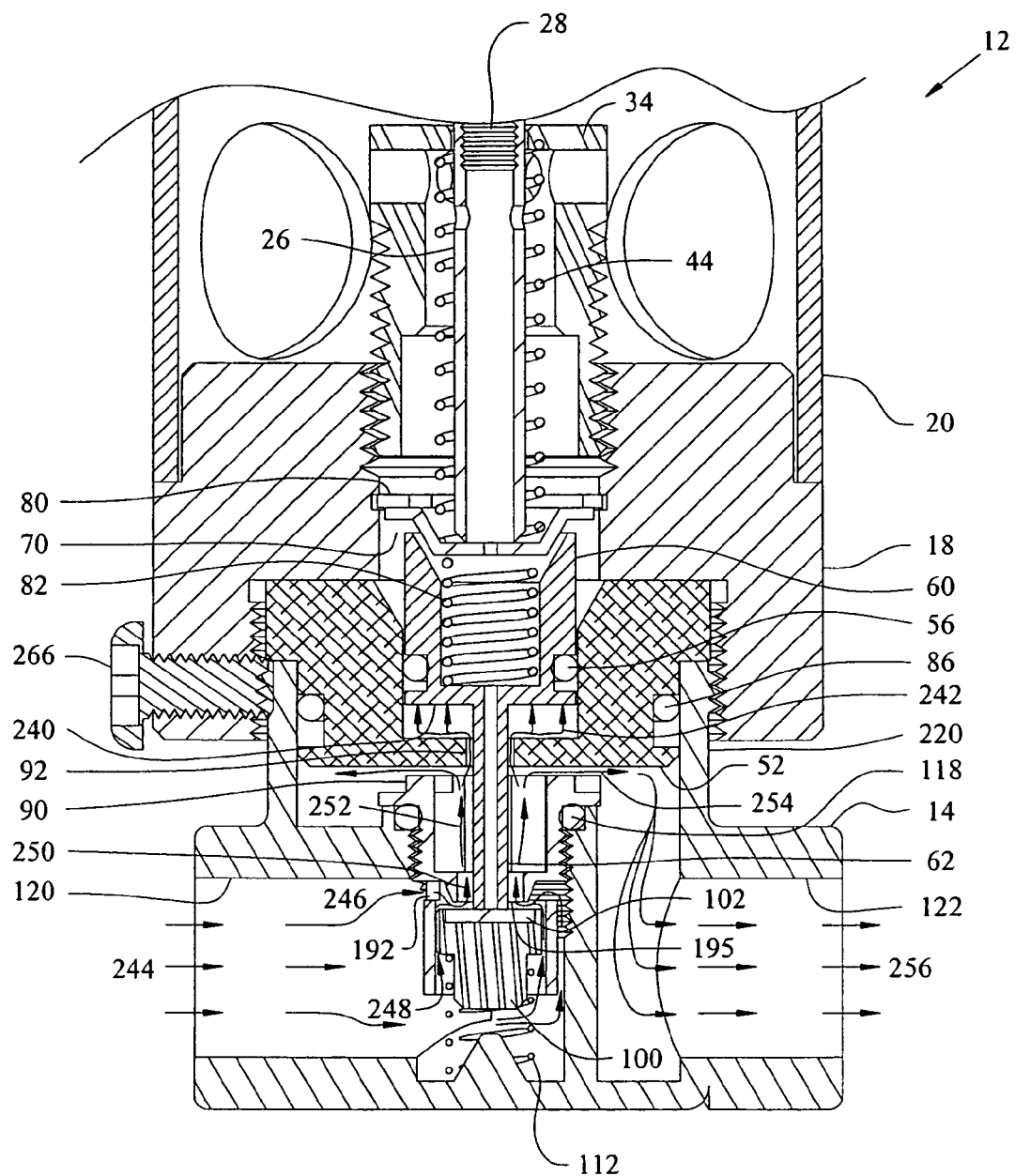
FIG. 31 is a cross-sectional view of a portion of the pressure regulator of FIG. 1 shown in a second operating condition.

Referring to FIG. 31, pressure regulator 12 is shown in a second operating condition which corresponds to segment AB of the pressure versus temperature curve in FIG. 33. In this second operating condition, and referring further to FIG. 37, the force $F_W$ generated by power element 148 (see FIG. 16) due to the relatively lower temperature of the water has decreased such that the combination of the force $F_W$ plus the force $F_{TS}$ of trim spring 44 is less than the force $F_{DMS}$ generated by dual mode spring 82. Thus, dual mode disk 70 is pressed upward into engagement with retaining ring 80 and is not engaged with piston 60. In this condition, the force balance is such that stem 62 has depressed pad 102 of poppet 100 out of engagement with sealing face 195 of orifice insert 90, and therefore $CO_2$ gas is allowed to flow through main regulator body 14 as described above in connection with FIG. 30. In operation, as the water temperature decreases from some point along segment BC of FIG. 33, this second condition will first be reached when the water temperature cools to temperature $T_2$ at point B, which is when dual mode disk 70 first comes into engagement with retaining ring 80. So long as the water temperature remains below $T_2$, retaining ring 80 will prevent further upward travel of disk 70, and the pressure at outlet 122 will remain constant at the selected pressure $P_1$.

Figure 32:
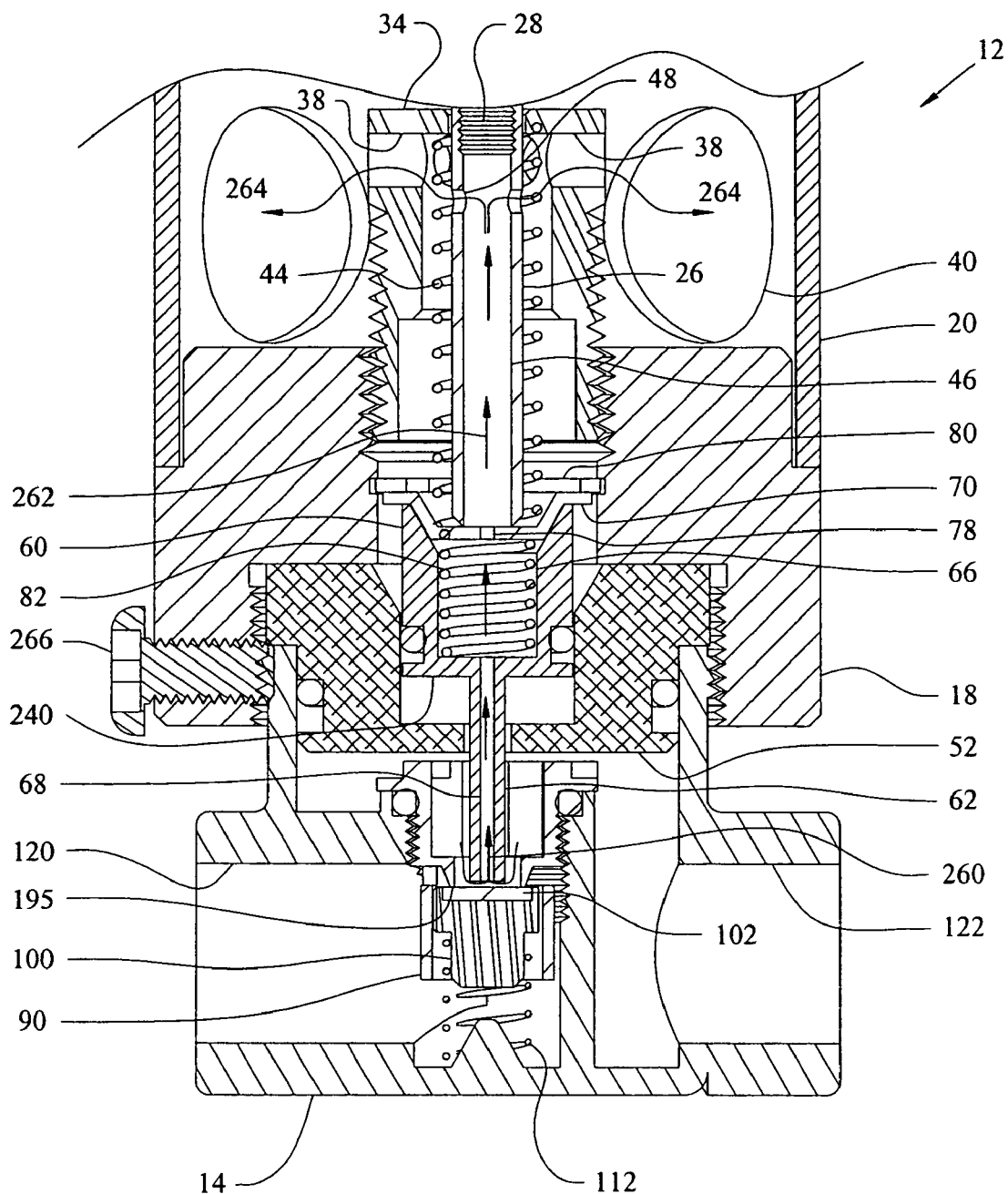
FIG. 32 is a cross-sectional view of a portion of the pressure regulator of FIG. 1 shown in a third operating condition.

Referring to FIG. 32, pressure regulator 12 is shown in a third operating condition in which $CO_2$ gas is allowed to be released if the pressure at the outlet 122 has become too great for the given water temperature. Such a condition may be realized if, for example, the water temperature has decreased over a period of time during which the associated dispensing unit has not been used to dispense any carbonated beverages. In this third operating condition, the $CO_2$ gas pressure acting on face 240 of piston 60 is sufficient to push piston 60 upward such that dual mode disk 70 is sandwiched into engagement with both retaining ring 80 and piston 60, and stem 62 is thereby lifted off of pad 102 of poppet 100, which allows excess $CO_2$ gas to escape upward through central bore 68 of piston stem 62 as indicated by arrow 260, through central bore 46 of push rod 26 as indicated by arrow 262, and finally outward through cross bores 48 and 38 and access holes 40 as indicated by arrows 264. This relieving gas flow will continue until a state of equilibrium is reached, at which point stem 62 will be seated on pad 102. Such a state of equilibrium is illustrated in FIG. 2.

As persons of ordinary skill in the art will appreciate, regulator assembly 10 thus provides a means of controlling the pressure of carbon dioxide at outlet 122 in response to the temperature of the water in temperature sensor 15. In one embodiment, regulator assembly 10 is designed to perform according to a curve ABC as illustrated in FIG. 33 in which
$T_1=55°$ F.;
$T_2=65°$ F.;
$T_3=88°$ F.;
$P_1=70$ psi;
$P_2=105$ psi.

As noted above, segment BC represents a standard carbonation level of 5.25:1.0 $CO_2$/water volume ratio. To achieve such performance, an Invensys RAS-16673 power element 148 may be employed to provide a force of 9.25 lb. at the 55° F., 57 psi condition and a force of 16.3 lb. at the 88° F., 105 psi condition. With a force difference $\Delta_F=16.3$ lb.-9.25 lb.=7.05 lb. and a pressure difference $\Delta_P=105$ psi-57 psi=48 psi, the cross-sectional area of face 240 of piston 60 may be sized at $A=\Delta_F/\Delta_P=7.05/48=0.1469$ in$^2$, which corresponds to a diameter of 0.432 in. In this embodiment, the springs of regulator 12 may be sized as follows:
poppet spring 112 having a spring constant of 3.1 lb./in.;
trim spring 44 having a spring constant of 4.3 lb./in.; and
dual mode spring 82 having a spring constant of 131.3 lb./in.

With the above sizing, poppet spring 112 provides a nominal force of 1.14 lb., trim spring 44 provides a nominal force of 0.26 lb., and dual mode spring 82 provides a nominal force of 10.3 lb. Again, the particular sizing and values set forth above are by way of illustration only and are not limiting to the present invention.

II. Pilot Operated Embodiments

A. Piston Configuration

Figure 46:
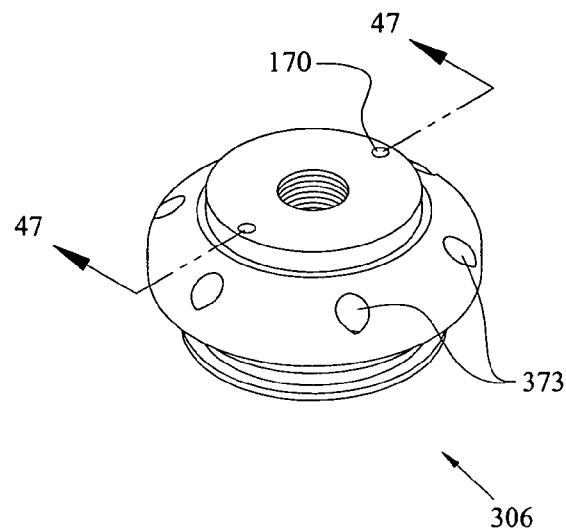
FIG. 46 is a perspective view of the bore body of the pressure regulator of FIG. 38.
Figure 47:
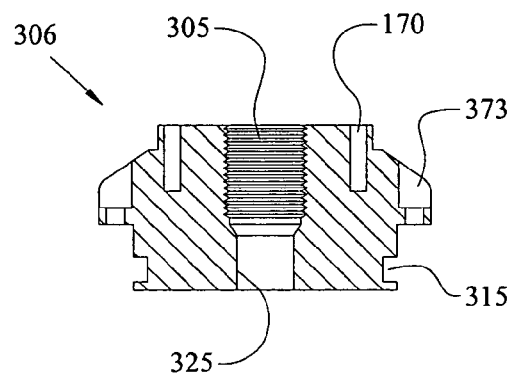
FIG. 47 is a cross-sectional view of the bore body of FIG. 46 taken in the direction of arrows 47-47.
Figure 48:
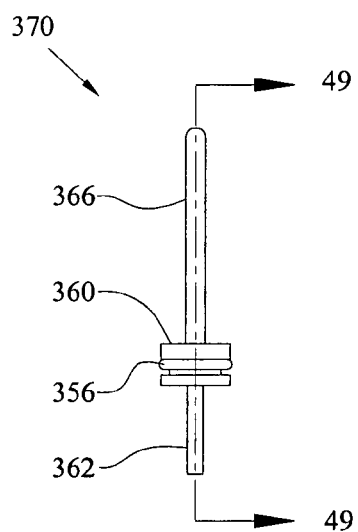
FIG. 48 is a side elevational view of the piston assembly within the pressure regulator of FIG. 38.
Figure 49:
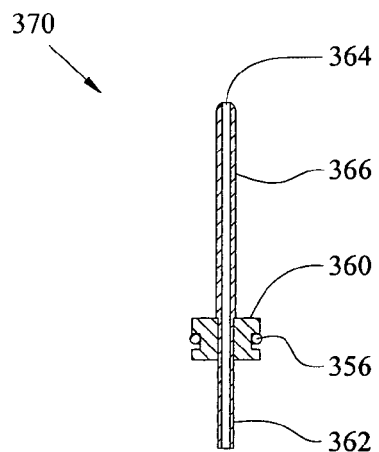
FIG. 49 is a cross-sectional view of the piston assembly of FIG. 48 taken in the direction of arrows 49-49.
Figure 50:
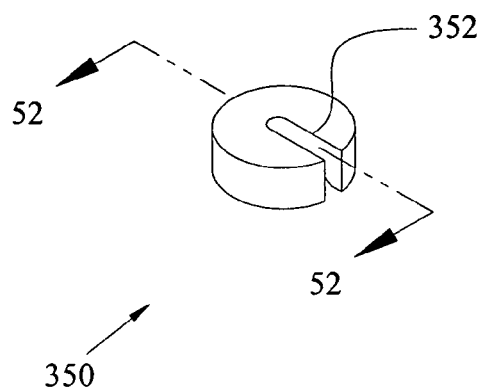
FIG. 50 is a perspective view of a spacer of the pressure regulator of FIG. 38.
Figure 51:
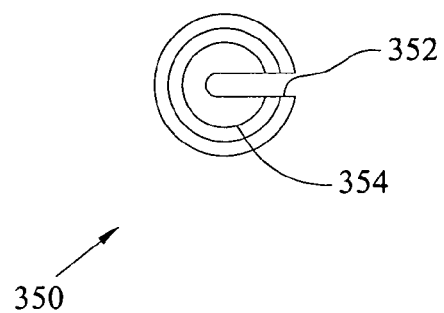
FIG. 51 is a bottom view of the spacer of FIG. 50.
Figure 52:
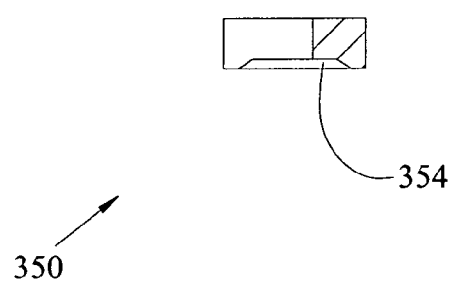
FIG. 52 is a cross-sectional view of the spacer of FIG. 50 taken in the direction of arrows 52-52.
Figure 53:
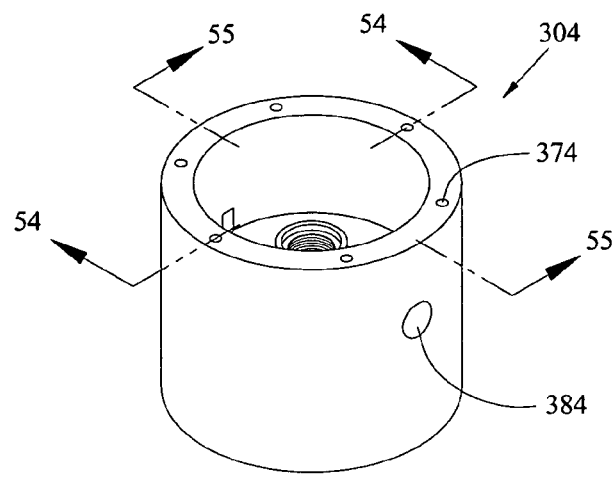
FIG. 53 is a top perspective view of the outlet body of the pressure regulator of FIG. 38.
Figure 54:
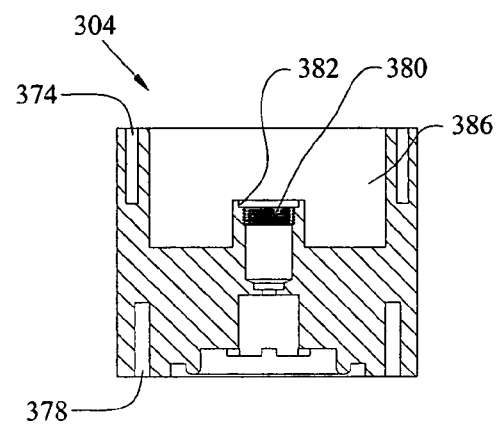
FIG. 54 is a cross-sectional view of the outlet body of FIG. 53 taken in the direction of arrows 54-54.
Figure 55:
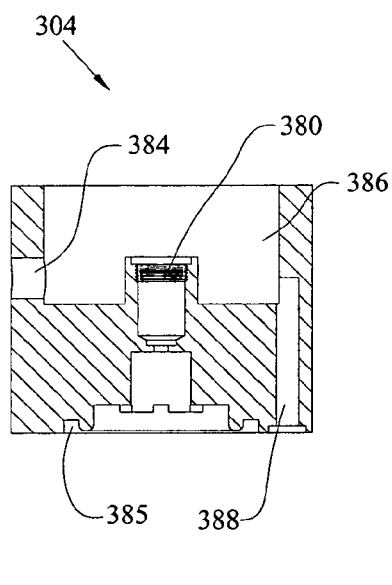
FIG. 55 is a cross-sectional view of the outlet body of FIG. 53 taken in the direction of arrows 55-55.
Figure 56:
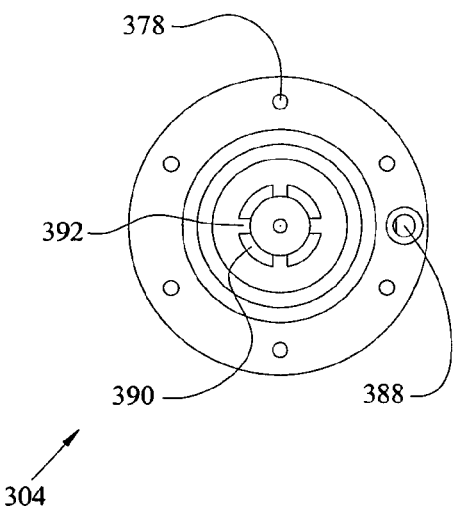
FIG. 56 is a bottom view of the outlet body of FIG. 53.
Figure 57:
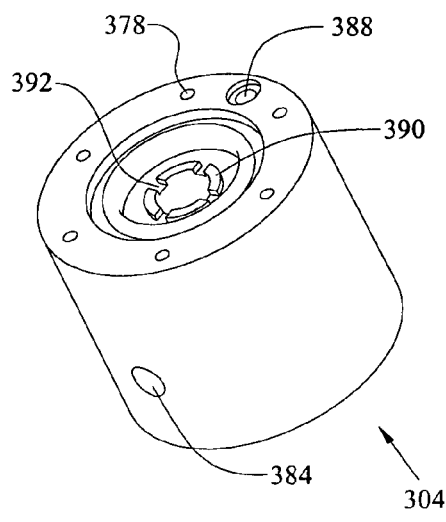
FIG. 57 is a bottom perspective view of the outlet body of FIG. 53.
Figure 58:
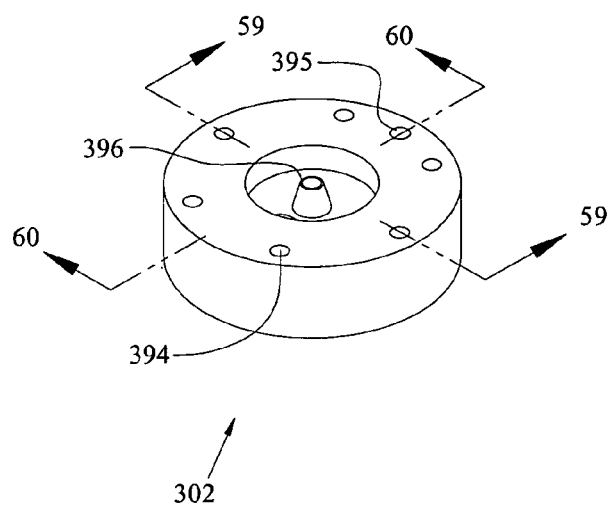
FIG. 58 is a perspective view of the inlet body of the pressure regulator of FIG. 38.
Figure 59:
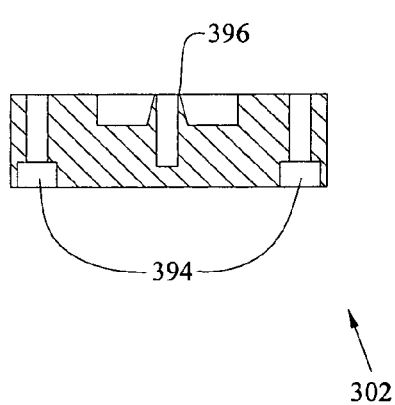
FIG. 59 is a cross-sectional view of the inlet body of FIG. 58 taken in the direction of arrows 59-59.
Figure 60:
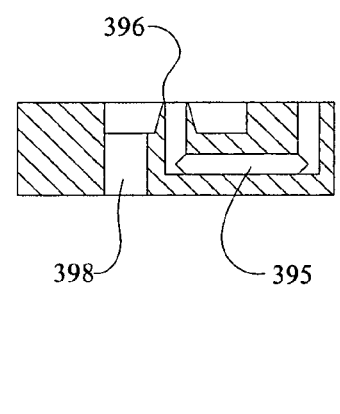
FIG. 60 is a cross-sectional view of the inlet body of FIG. 58 taken in the direction of arrows 60-60.
Figure 61:
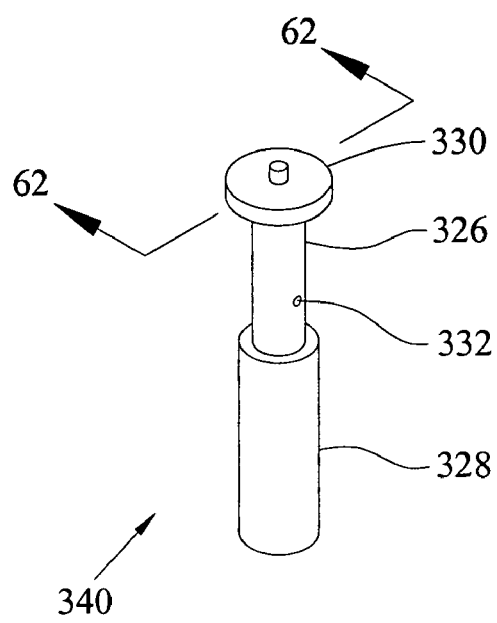
FIG. 61 is a perspective view of the force transmission tube assembly of the pressure regulator of FIG. 38.
Figure 62:
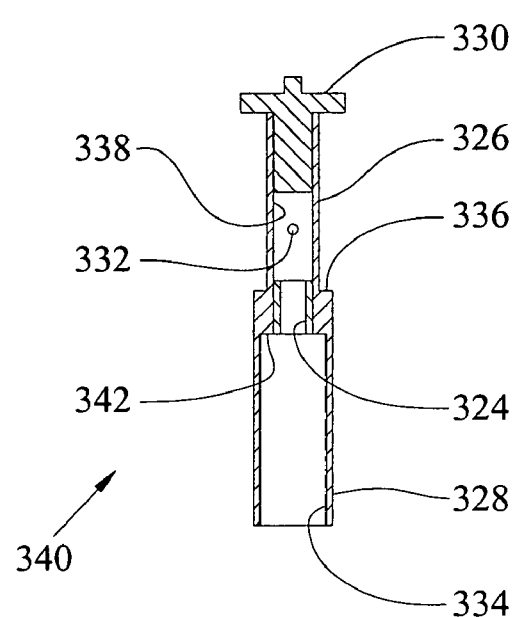
FIG. 62 is a cross-sectional view of the force transmission tube assembly of FIG. 61 taken in the direction of arrows 62-62.

Referring primarily to FIGS. 38-41, a pressure regulator assembly 300 comprises a pressure regulator 312 and a temperature sensor 15 connected by a conduit 16, which may be a capillary tube that forms part of a power element 148 as further described below. Pressure regulator 312 has an outlet body 304 in which an orifice insert 90 is installed with an O-ring 118. Referring also to FIGS. 53-57, outlet body 304 has a threaded recess 380 for receiving orifice insert 90, a recess 382 for receiving O-ring 118, and another recess 385 for receiving a diaphragm 308 as described further below. A poppet 100 is disposed within orifice insert 90 for regulating gas flow through orifice insert 90 as described further below. A spring 320 biases poppet 100 into engagement with orifice insert 90. Outlet body 304 is connected to a bore body 306 by a plurality of recessed screws 372 installed in tapped holes 374 of outlet body 304. An O-ring 316 may be provided to seal the interface between outlet body 304 and bore body 306. An inlet body 302 may be connected to outlet body 304 by a plurality of recessed screws 376 installed in holes 394 of inlet body 302 and tapped holes 378 of outlet body 304. A diaphragm 308 is captured between inlet body 302 and outlet body 304, and a stabilizer plate 310 may be affixed to the upper side of diaphragm 308. Referring also to FIG. 42, a bleed hole 335 is provided through diaphragm 308, and a corresponding bleed hole 345 is provided through stabilizer plate 310. Stabilizer plate 310 has a boss 322 for stabilizing a spring 318 that biases diaphragm 308 toward engagement with a sealing surface 396 at the opening of passageway 395 in inlet body 302, which is shown separately in FIGS. 58-60. An O-ring 314 may be provided to seal the interface between passageway 395 of inlet body 302 and passageway 388 of outlet body 304. A piston assembly 370 having a piston 360 is disposed within a central bore 325 of bore body 306. Piston assembly 370, which is shown separately in FIGS. 48 and 49, may have an O-ring 356 for sealing the interface between piston 360 and bore 325 while allowing piston 360 to slide within bore 325. Piston assembly 370 has an upper stem 366 and a lower stem 362 with a central passageway 364 traversing through the assembly. Stems 362 and 366 are fixed to piston 360. Piston 360 serves as a pressure reacting member on which the pressure of the $CO_2$ gas acts as indicated by arrows 301j in FIG. 42. As shown in FIGS. 46 and 47, bore body 306 has a threaded passageway 305 for receiving a threaded adjustment screw 34, which is shown separately in FIGS. 28 and 29. A force transmission tube assembly 340, which is shown separately in FIGS. 61 and 62, is installed through adjustment screw 34. Force transmission tube assembly 340 may comprise an upper tube 326 having a central passageway 338 and a lower tube 328 having a central passageway 334. An insert 330 is slidably installed in passageway 338 on the upper end of assembly 340, and a bushing 324 is fixedly installed at the lower end of passageway 338. Bushing 324 receives and stabilizes stem 366 of piston assembly 370 such that stem 366 may slide in bushing 324. A hole 332 is provided in tube 326 to allow gas to escape in a pressure relief mode as described further below. The head of insert 330 fits into a recess 32 formed on the underside of a bellows 24 of a bellows assembly 146. A trim spring 344 is captured between shoulder 342 of force transmission tube assembly 340 (see FIG. 62) and piston 360. In this embodiment, a force transmission assembly is formed by force transmission tube assembly 340 and spring 344 to transmit forces between bellows 24 and piston 360. A body tube 20 is engaged with bore body 306, and a bellows cap 22 is provided at the top end of body tube 20 to hold bellows assembly 146 in proper position. A pair of tapped holes 170 are provided in bore body 306 for receiving a pair of tie rods 270, which are engaged at their upper ends in holes 202 of bellows cap 22 (see FIGS. 13 and 14) for holding bellows cap 22, body tube 20, and bore body 306 together. Tie rods 270 are secured at their upper ends via nuts 268. A spacer 350 and a shim 358 are provided between bellows cap 22 and bellows assembly 146 for reasons to be described below. As shown in FIGS. 50-52, spacer 350 has a slot 352 for accommodating conduit 16. Spacer 350 also has a recess 354 on its underside for receiving bellows assembly 146. Temperature sensor 15 of pressure regulator assembly 300 is the same as described above for pressure regulator assembly 10. As mentioned above for pressure regulator assembly 10, pad 102 of poppet 100 may comprise a resilient material, such as rubber, for sealing engagement with stem 362 of piston assembly 370 and sealing surface 195 of orifice insert 90 as described further below.

Referring to FIGS. 19-23 and 41, orifice insert 90 may be as described above for pressure regulator assembly 10. Ribs 186 of orifice insert 90 stabilize and centrally align stem 362 of piston assembly 370 within orifice insert 90 while allowing sliding movement of stem 362 with respect to orifice insert 90.

Figure 41:
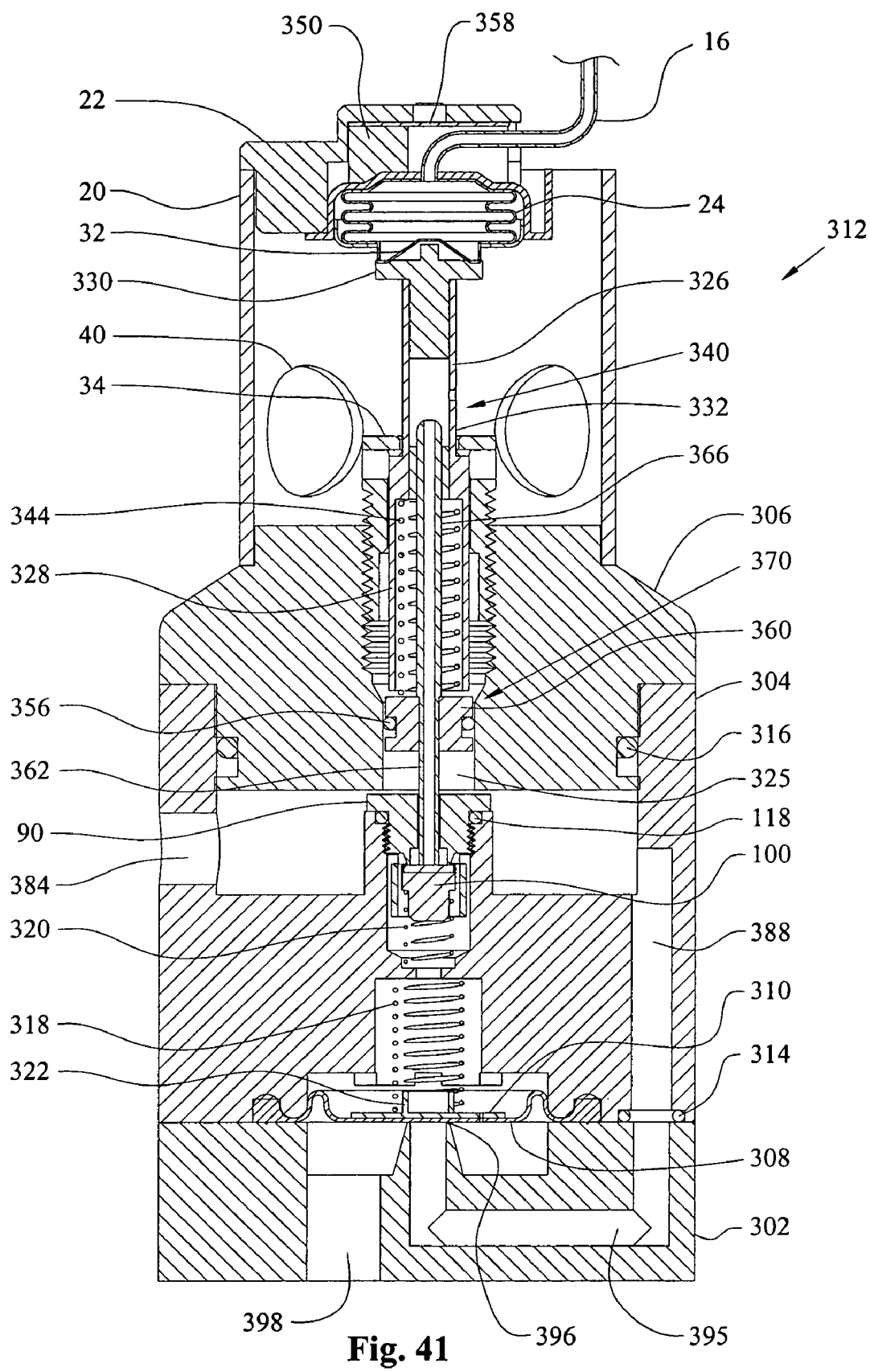
FIG. 41 is an enlarged cross-sectional view of the pressure regulator of FIG. 38 taken in the direction of arrows 39-39.
Figure 42:
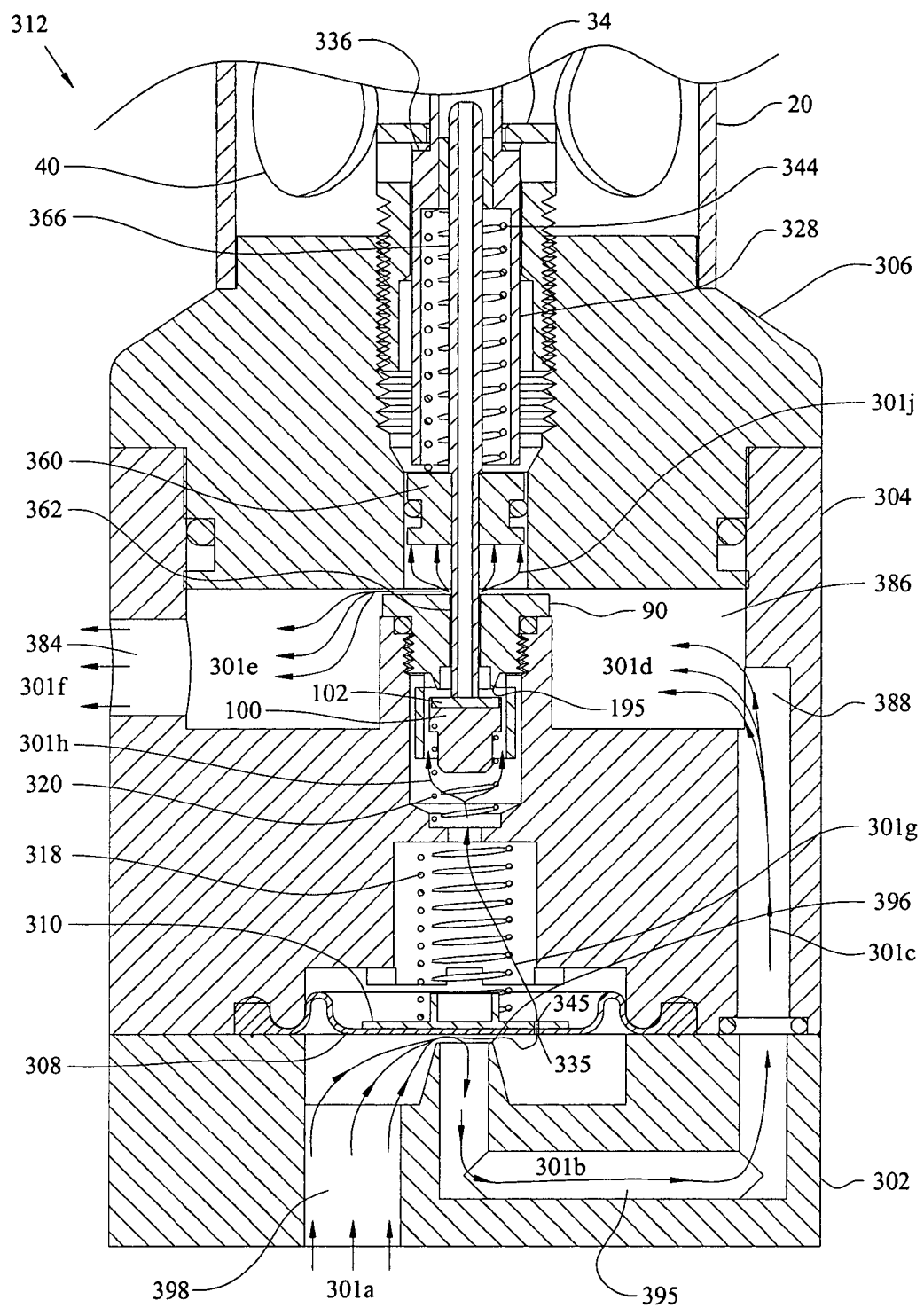
FIG. 42 is a further enlarged partial cross-sectional view of the pressure regulator of FIG. 38 shown in a first operating condition.

Referring to FIGS. 28-29 and 41, threads 36 of adjustment screw 34 engage with mating threads 305 in bore body 306 as shown in FIG. 47. Hole 172 in adjustment screw 34 receives stem 326 of force transmission tube assembly 340.

Referring again to FIGS. 42, 56, and 57, the underside of outlet body 304 may have a plurality of protrusions 390 separated by gaps 392. If the pressure differential across diaphragm 308 is sufficient to move diaphragm 308 to its maximum upward position such that stabilizer 310 is engaged upon protrusions 390, then gaps 392 will still allow gas to flow upward through body 304 as indicated by arrow 301g.

The operation of pressure regulator assembly 300 will now be described with primary reference to FIGS. 42, 43, and 44, which depict pressure regulator 312 in three different modes of operation. Inlet 398 of pressure regulator 312 may be connected to a source of pressurized $CO_2$ gas (not shown), and outlet 384 of pressure regulator 312 may be connected to a carbonator (not shown) in which the $CO_2$ gas is mixed with water. As described further below, pressure regulator 312 is capable of precisely controlling the pressure at which $CO_2$ gas is introduced into the water of a post-mix carbonated beverage system in order to maintain a desired volume ratio of $CO_2$ to water over a wide range of ambient temperatures.

Similar to pressure regulator assembly 10 described above, pressure regulator assembly 300 is designed to perform in accordance with a segmented pressure versus temperature curve having a plurality of slopes such as that shown in FIG. 33 in order to maintain sufficient pressure in a lower temperature range. As shown in FIG. 33, if the water temperature is between $T_2$ and $T_3$, pressure regulator 312 regulates the $CO_2$ pressure according to segment BC of the curve, which may follow a predetermined carbonation level, such as 5.25 $CO_2$/water volume ratio, for example. However, if the water temperature is below $T_2$, pressure regulator 312 maintains the $CO_2$ pressure at a constant pressure $P_1$ along segment AB of the curve. For a standard 5.25 $CO_2$/water volume ratio, a suitable value for $P_1$ is about 70 psi, and a suitable value for $T_2$ is about 65° F. Once again, persons of skill in the art will recognize that the particular carbonation level and the pressure and temperature values for breakpoint B may be selected at any desirable values, and the foregoing values are merely exemplary and not limiting to the present invention.

Figure 45:
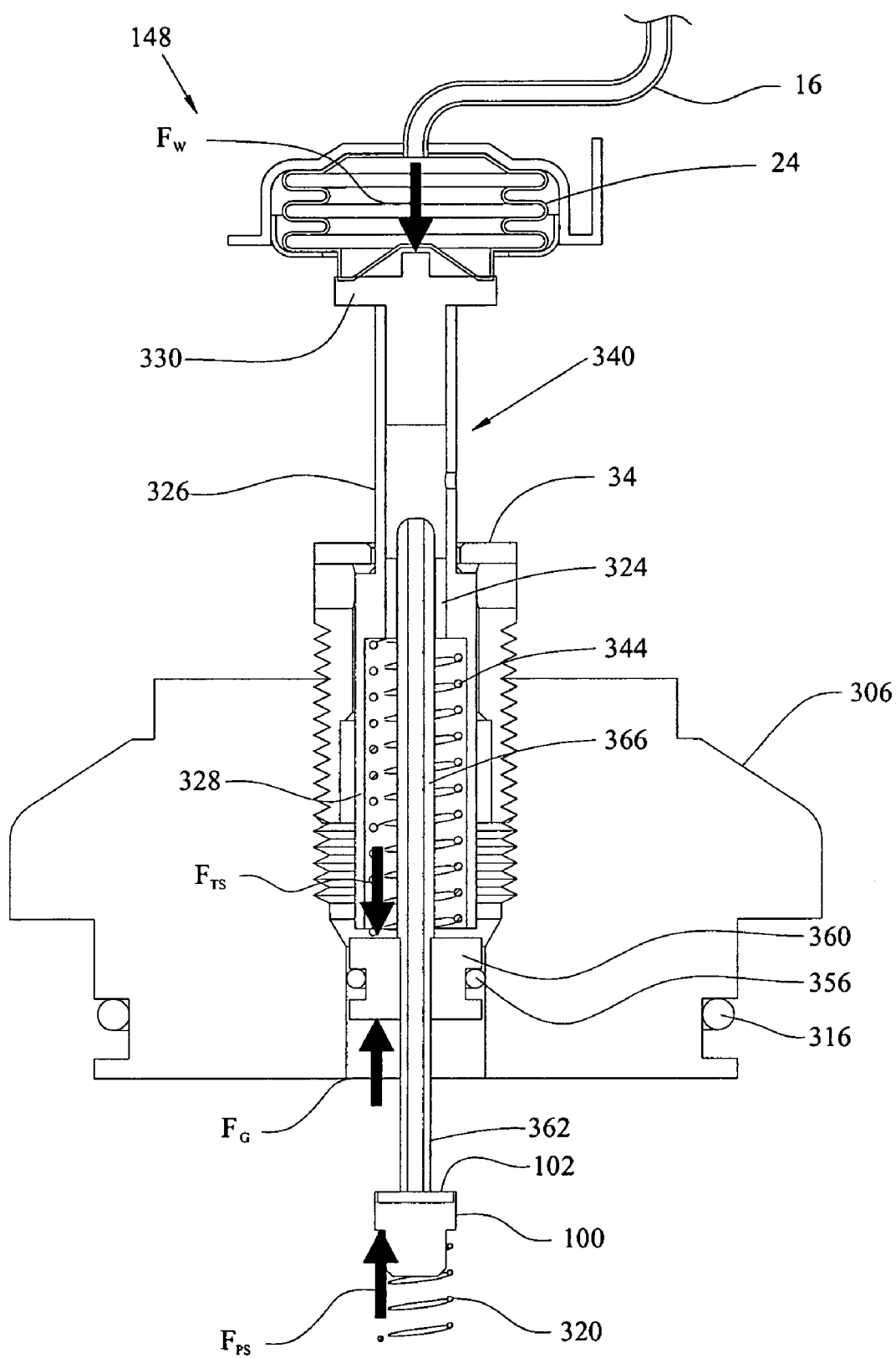
FIG. 45 is a schematic diagram illustrating various forces acting on the piston within the pressure regulator of FIG. 38.

Referring now to FIG. 42, pressure regulator 312 is shown in a first operating condition that corresponds to segment BC of the pressure versus temperature curve in FIG. 33. In this first operating condition, and referring further to FIG. 45, the combination of the force $F_W$ generated by power element 148 (see FIGS. 39 and 16) due to the relatively higher temperature of the water (which is transmitted to force transmission tube assembly 340 via insert 330) plus the force $F_{TS}$ of trim spring 344 acting downward on piston 360 is balanced by a combination of upward forces, namely, a force $F_G$ due to the pressure of the $CO_2$ gas acting on the bottom face of piston 360 as indicated by arrows 301j and a force $F_{PS}$ generated by poppet spring 320, which is transmitted to stem 362 of piston 360 through poppet 100. The force balance in this condition is such that shoulder 336 of force transmission tube assembly 340 is not engaged with adjustment screw 34, and stem 362 has depressed pad 102 of poppet 100 out of engagement with sealing face 195 of orifice insert 90, which creates a pressure drop across diaphragm 308 as $CO_2$ gas flows through openings 335 and 345 as indicated by arrow 301g. The $CO_2$ gas thus flows along a first flow path from inlet 398 as indicated by arrows 301a, through openings 335 and 345 as indicated by arrow 301g, through orifice insert 90 as indicated by arrows 301h, through chamber 386 as indicated by arrows 301e, and exits through outlet 384 as indicated by arrows 301f. Spring 318 may be sized such that the pressure drop across diaphragm 308 quickly overcomes the force of spring 318 acting downward on diaphragm 308, which causes diaphragm 308 to move upward and out of engagement with sealing surface 396 of inlet body 302. The $CO_2$ gas is then allowed to flow along a second flow path from inlet 398 as indicated by arrows 301a, through passageway 395 as indicated by arrow 301b, through passageway 388 as indicated by arrow 301c, into chamber 386 as indicated by arrows 301d, over orifice insert 90 as indicated by arrows 301e, and exit through outlet 384 as indicated by arrows 301f. Persons of skill in the art will thus recognize that orifice insert 90 of the first flow path, which has a relatively small gas flow capacity, serves as a "pilot" to facilitate the actuation of diaphragm 308, which allows a much higher gas flow rate along the second flow path from arrows 301a to 301f. In this manner, regulator 312 provides both high sensitivity and quick response to fluctuations in water temperature.

Referring again to FIG. 42, instead of providing openings 335 and 345 in diaphragm 308 and stabilizer plate 310, respectively, which may be very small (e.g., the size of a pin hole) and may become vulnerable to clogging by small particles in the $CO_2$ gas, additional connecting passageways (not shown) may be provided in inlet body 302 and outlet body 304 so as to provide fluid communication between the chambers that are above and beneath diaphragm 308 in order to form a pressure differential across diaphragm 308 as described above. In such an alternative embodiment, the additional connecting passageways may be of larger capacity than openings 335 and 345 (e.g., about 0.25-in. diameter), and a filter may be placed at some point along the connecting passageways. The filter serves to restrict the flow capacity of the connecting passageways in a controlled manner to achieve the desired pressure differential across diaphragm 308. For example, the filter may be a ceramic disk that has a desired degree of porosity, which may be accurately controlled during the sintering process according to methods well known in the art. Of course, other materials could also be used for the filter, such as metal, plastic, or paper, for example. The filter also serves to remove unwanted particles from the $CO_2$ gas. This alternative embodiment avoids the possibility of clogging small openings 335 and 345 and also simplifies the manufacturing and maintenance of the regulator.

Although one embodiment of regulator 312 described herein comprises an inlet body having an inlet through which $CO_2$ gas enters the regulator and an outlet body having an outlet through which $CO_2$ gas exits the regulator, persons of ordinary skill in the art will appreciate that the inlet and the outlet may be provided in the same pressure regulator body. Also, although one embodiment of regulator 312 described herein comprises an orifice insert having an orifice through which the $CO_2$ gas flows along a first flow path having a relatively lower gas flow capacity, the first flow path may be provided with suitable structure other than an orifice insert having an orifice. Additionally, although the first flow path may be controlled by a poppet valve as described herein, any suitable valve may be used for opening and closing the first flow path. Similarly, although the second flow path having a relatively higher gas flow capacity may be controlled by a diaphragm valve as described herein, any suitable valve may be used for opening and closing the second flow path. For example, a cylinder may be slidably disposed within a bore beneath the poppet valve such that the bottom face of the cylinder is biased toward closing engagement with an opening to the second flow path, and the clearance between the cylinder and the bore is analogous to the bleed hole 335 through diaphragm 308 described above. Many other suitable valve structures could also be used as persons skilled in the art will recognize.

Figure 43:
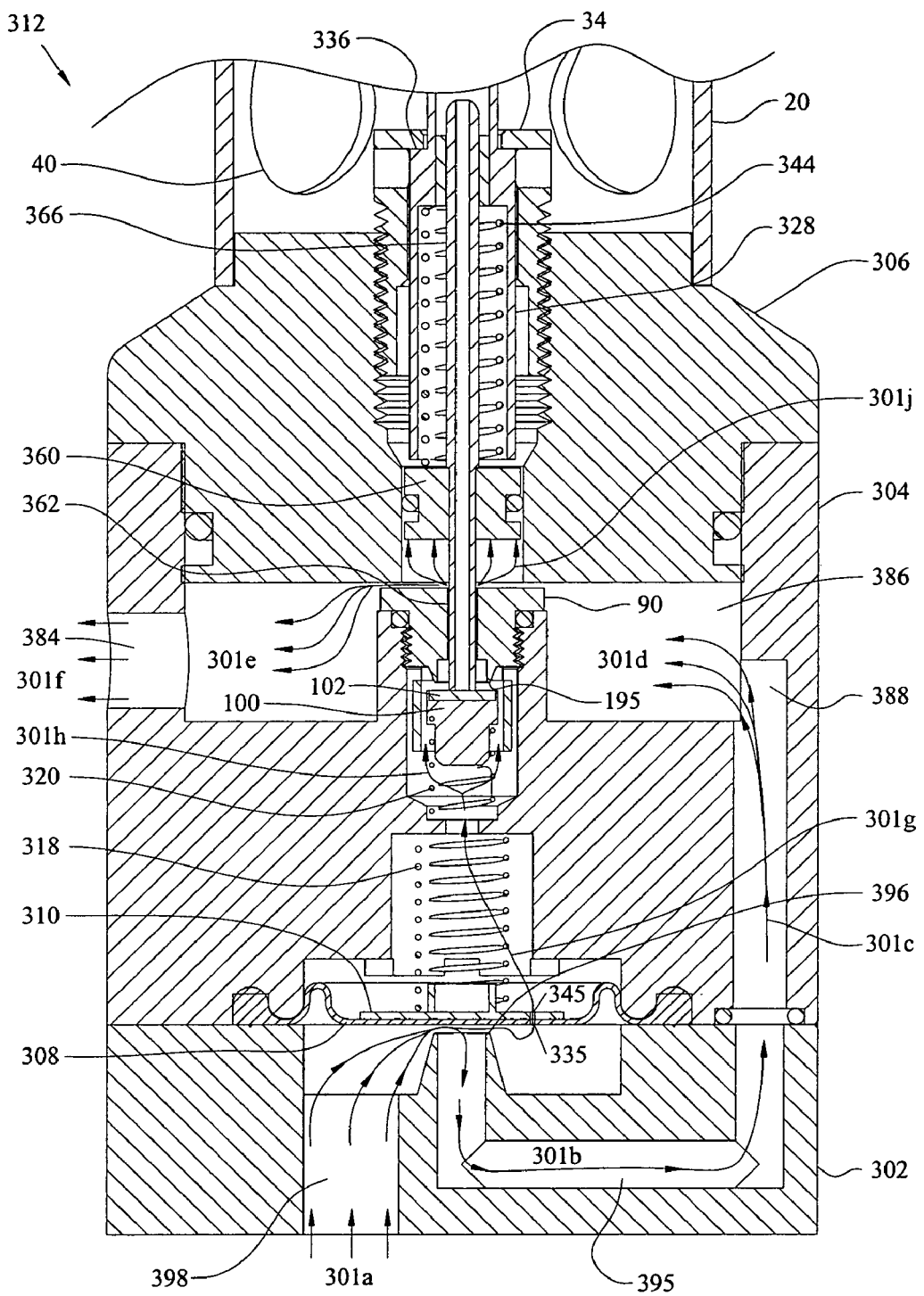
FIG. 43 is a further enlarged partial cross-sectional view of the pressure regulator of FIG. 38 shown in a second operating condition.

Referring now to FIG. 43, pressure regulator 312 is shown in a second operating condition that corresponds to segment AB of the pressure versus temperature curve in FIG. 33. In this second operating condition, and referring further to FIG. 45, the force $F_W$ generated by power element 148 (see FIGS. 39 and 16) due to the relatively lower temperature of the water has decreased such that shoulder 336 of force transmission tube assembly 340 is engaged with adjustment screw 34. In this condition, spring 344 alone regulates the pressure at outlet 384, and the force balance is such that stem 362 has depressed pad 102 of poppet 100 out of engagement with sealing face 195 of orifice insert 90, and therefore $CO_2$ gas is allowed to flow through regulator 312 as described above in connection with FIG. 42. In operation, as the water temperature decreases from some point along segment BC of FIG. 33, this second condition will first be reached when the water temperature cools to temperature $T_2$ at point B, which is when shoulder 336 first comes into engagement with adjustment screw 34. So long as the water temperature remains below $T_2$, adjustment screw 34 will prevent further upward travel of force transmission tube assembly 340, and the pressure at outlet 384 will remain constant at the selected pressure $P_1$ so that a sufficient flow rate may be realized at the beverage dispenser. The parts may be sized such that piston 360 never engages tube 328 of force transmission tube assembly 340 so that regulator 312 may perform as desired along segment BC of the pressure versus temperature curve of FIG. 33.

Figure 39:
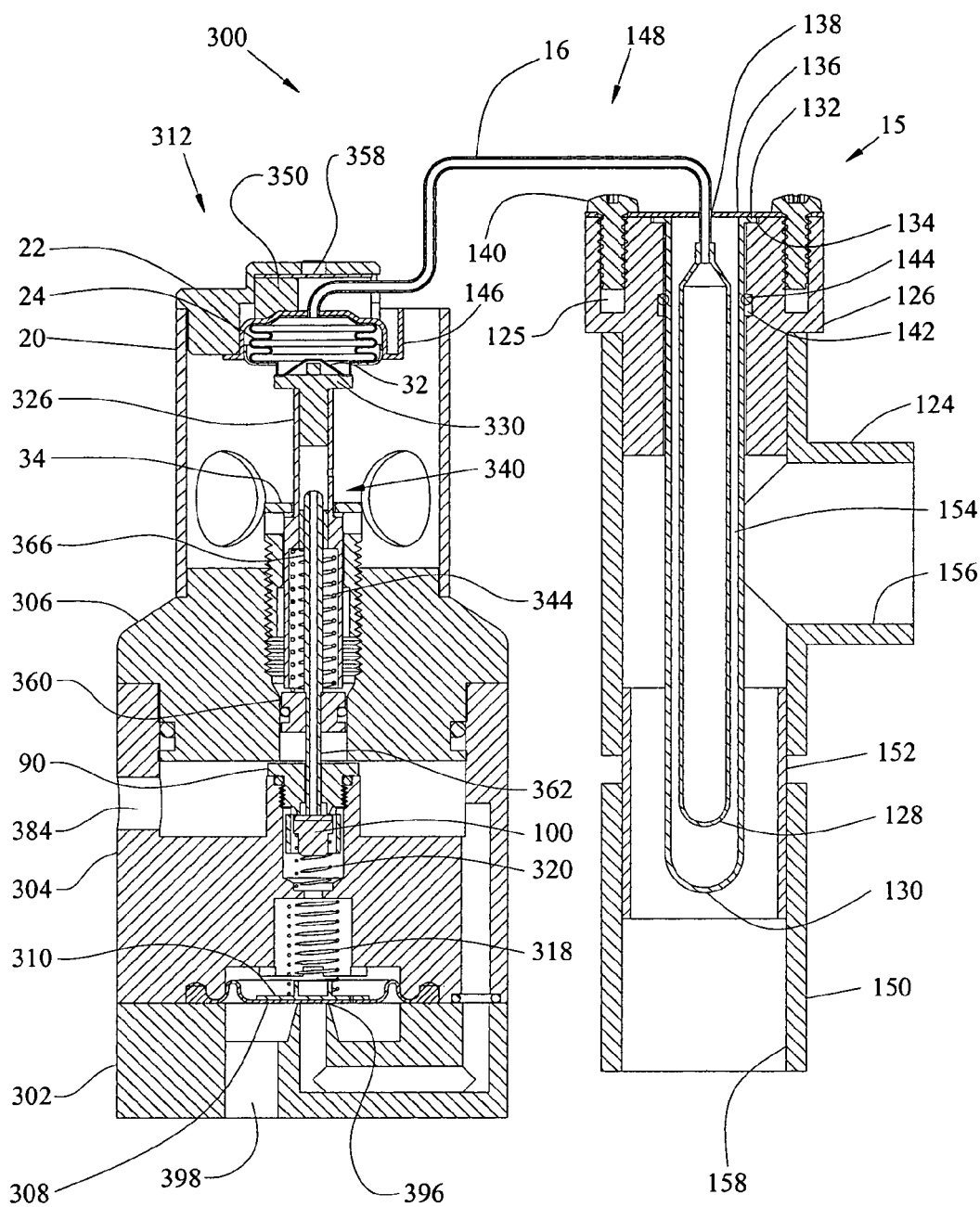
FIG. 39 is a cross-sectional view of the pressure regulator assembly of FIG. 38 taken in the direction of arrows 39-39.
Figure 40:
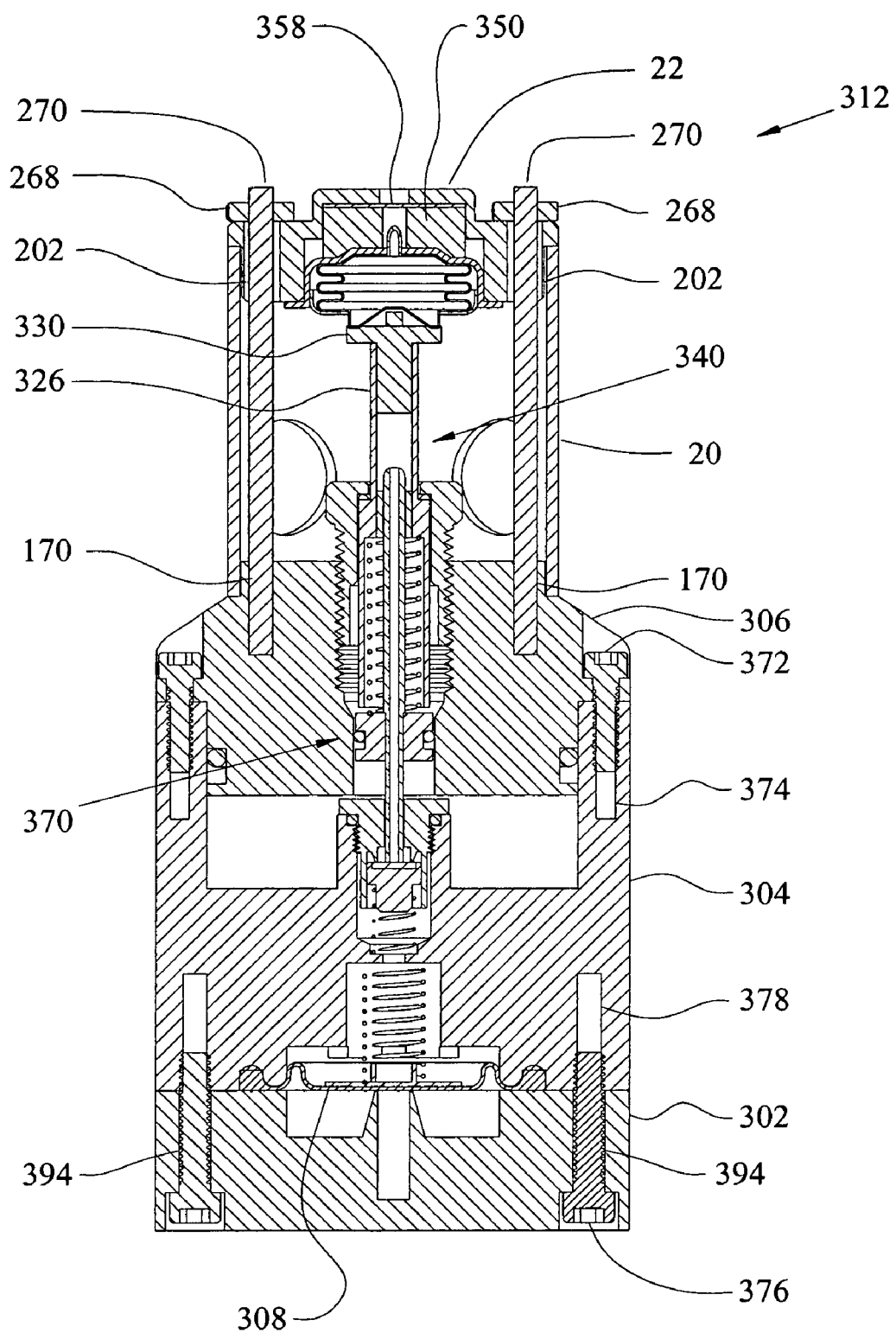
FIG. 40 is a cross-sectional view of the pressure regulator of FIG. 38 taken in the direction of arrows 40-40.
Figure 44:
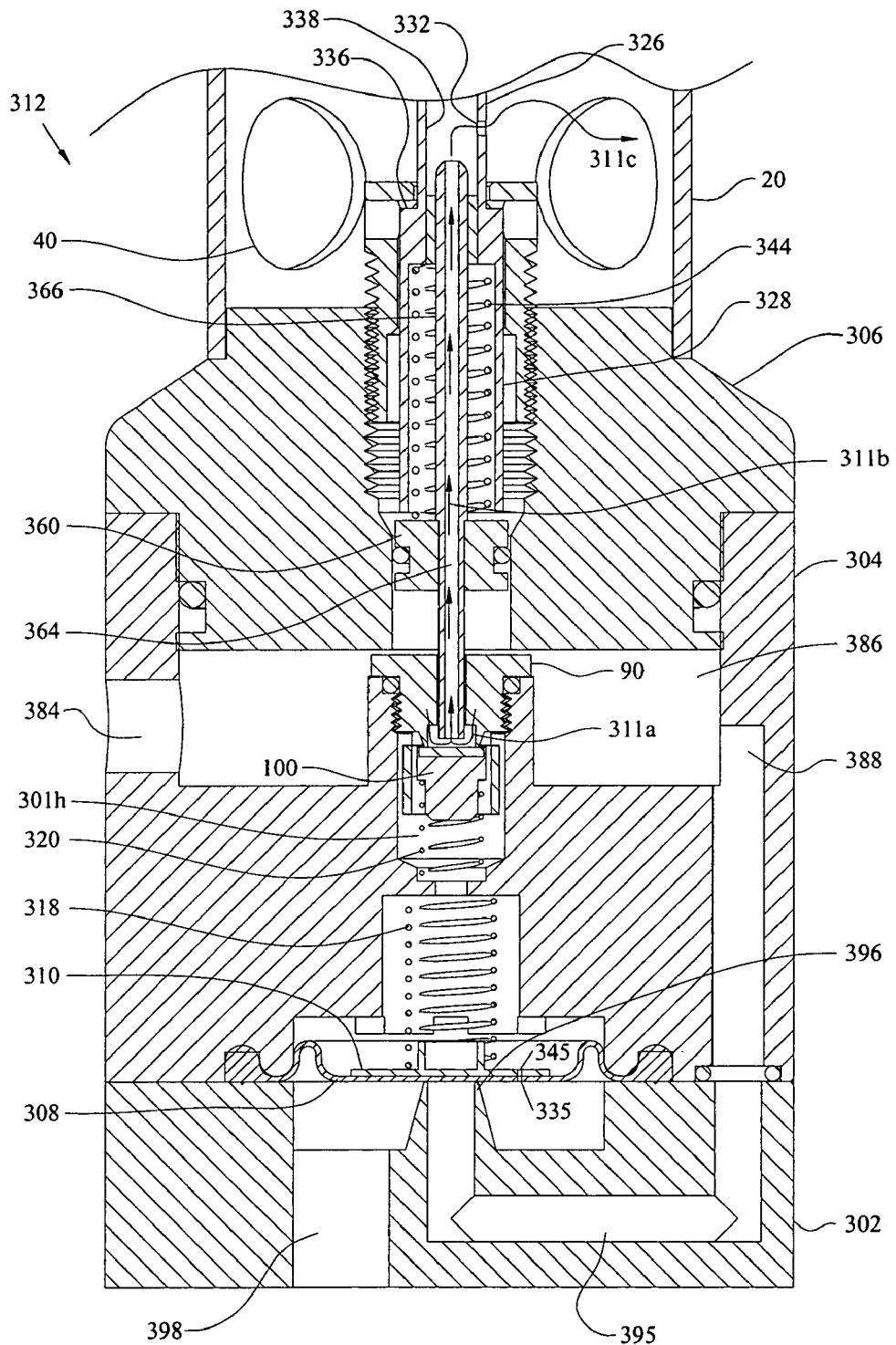
FIG. 44 is a further enlarged partial cross-sectional view of the pressure regulator of FIG. 38 shown in a third operating condition.

Referring now to FIG. 44, pressure regulator 312 is shown in a third operating condition in which $CO_2$ gas is allowed to be released if the pressure at the outlet 384 has become too great for the given water temperature. Such a condition may be realized if, for example, the water temperature has decreased over a period of time during which the associated dispensing unit has not been used to dispense any carbonated beverages. In this third operating condition, the $CO_2$ gas pressure acting on the lower face of piston 360 (plus the nominal force $F_{PS}$ of spring 320) is sufficient to push piston assembly 370 upward such that stem 362 is thereby lifted off of pad 102 of poppet 100, which allows excess $CO_2$ gas to escape upward through central bore 364 of piston assembly 370 as indicated by arrows 311a and 311b, through passageway 338 and hole 332 of tube 326, and exit through holes 40 of tube 20 as indicated by arrow 311c. This relieving gas flow will continue until a state of equilibrium is reached, at which point stem 362 will again be seated on pad 102. Such a state of equilibrium is illustrated in FIGS. 39 and 41.

As persons of ordinary skill in the art will appreciate, regulator assembly 300 thus provides a means of controlling the pressure of carbon dioxide at outlet 384 in response to the temperature of the water in temperature sensor 15. In one embodiment, regulator assembly 300 is designed to perform according to a curve ABC as illustrated in FIG. 33 in which $T_1$=55° F.;

$T_2$=65° F.;

$T_3$=88° F.;

$P_1$=70 psi;

$P_2$=105 psi.

As noted above, segment BC represents a standard carbonation level of 5.25:1.0 $CO_2$/water volume ratio. To achieve such performance, an Invensys RAS-16673 power element 148 may be employed to provide a force of 9.25 lb. at the 55° F., 57 psi condition and a force of 16.3 lb. at the 88° F., 105 psi condition. With a force difference $\Delta_F$=16.3 lb.-9.25 lb.=7.05 lb. and a pressure difference $\Delta_P$=105 psi-57 psi=48 psi, the cross-sectional area of piston 360 may be sized at A=$\Delta_F/\Delta_P$=7.05/48=0.1469 $in^2$, which corresponds to a diameter of 0.432 in. The foregoing piston sizing may be adjusted to account for the area taken up by stem 362. In this embodiment, the springs of regulator 312 may be sized as follows:

poppet spring 320 having a spring constant of 3.1 lb./in.;

trim spring 344 having a spring constant of 20.0 lb./in.; and diaphragm spring 318 having a spring constant of 7.1 lb./in.

With the above sizing, poppet spring 320 provides a force of 1.14 lb. when poppet 100 is in closed engagement with orifice insert 90, trim spring 344 provides a force of 10.28 lb. when shoulder 336 of force transmission tube assembly 340 is engaged with adjustment screw 34, and diaphragm spring 318 provides a force of 1.73 lb. when diaphragm 308 is in closed engagement with sealing surface 396. Again, the particular sizing and values set forth above are by way of illustration only and are not limiting to the present invention.

Referring again to FIG. 39, shim 358 provides a means to calibrate the desired force to be provided by power element 148. By monitoring the pressure at outlet 384 during installation of assembly 300, the appropriate thickness of shim 358 may be selected so that the appropriate force is transmitted to force transmission tube assembly 340 by bellows assembly 146.

B. Piston & Dual Mode Disk Configuration

Figure 63:
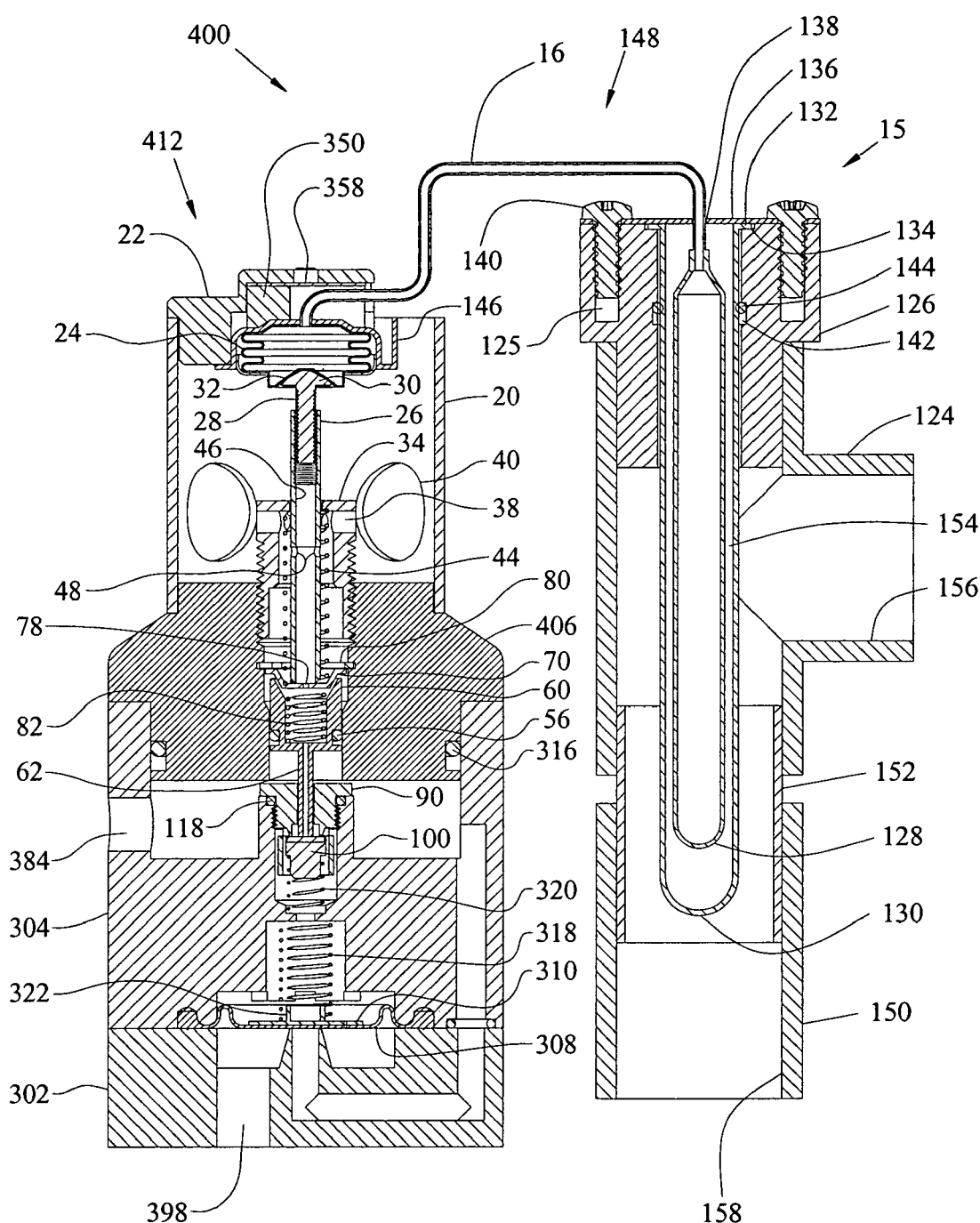
FIG. 63 is a cross-sectional view of another alternative embodiment of a pressure regulator assembly.
Figure 64:
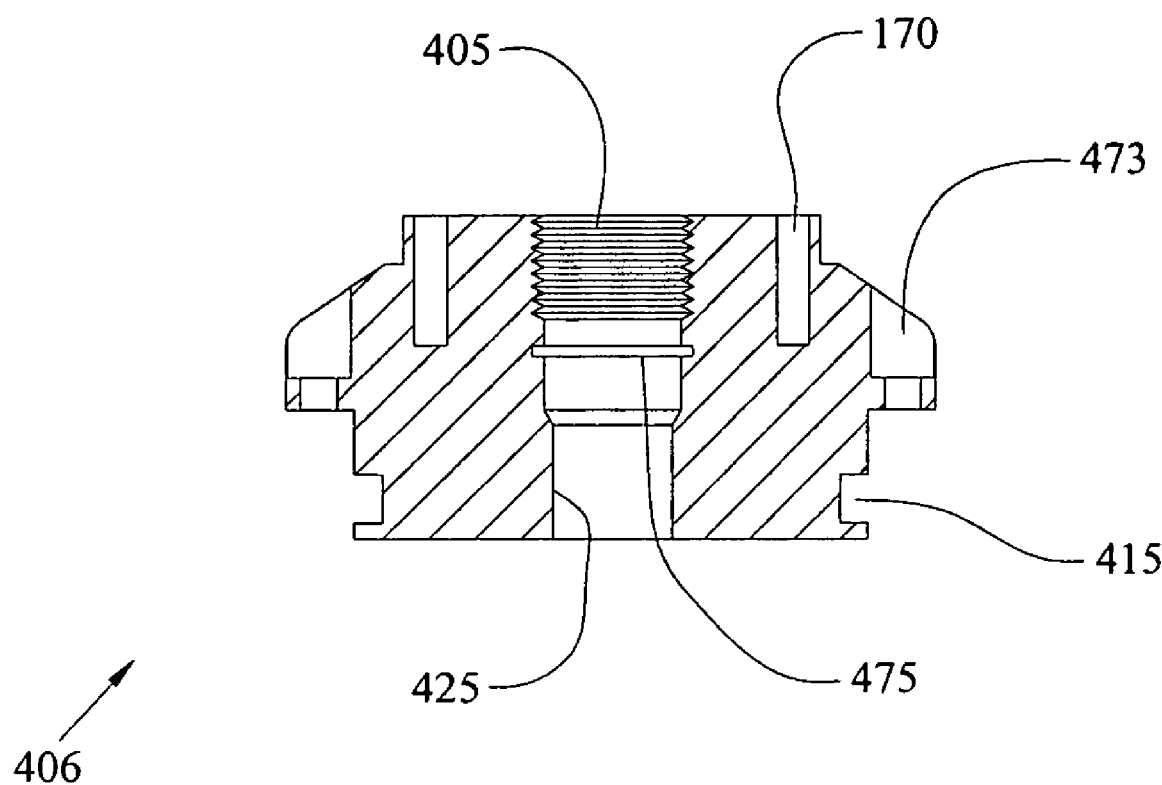
FIG. 64 is an enlarged cross-sectional view of the bore body of the pressure regulator of FIG. 63.

Referring to FIG. 63, an alternative pressure regulator assembly 400 is shown that is much like pressure regulator assembly 300 described above, except that assembly 400 has a different bore body and piston configuration, among other things. Referring also to FIG. 64, the bore body 406 of assembly 400 has a groove 475 for receiving a retaining ring 80, such as a snap ring, which limits the upward travel of a dual mode disk 70 for reasons to be described below. A piston 60, which is depicted separately in FIGS. 24 and 25, is disposed within a central regulator bore 425 of bore body 406, and piston 60 is sealingly engaged in regulator bore 425 by an O-ring 56 disposed within a groove 58. Like piston 360 discussed above, piston 60 serves as a pressure reacting member on which the pressure of the $CO_2$ gas acts. Piston 60 has a stem 62 which traverses downward through orifice insert 90 into abutting engagement with poppet 100. Piston 60 has a counterbore 66 for receiving a dual mode spring 82. Piston 60 also has a countersink 64 for receiving dual mode disk 70. Spring 82 biases dual mode disk 70 in an upward direction. An adjustment screw 34 is threadably engaged with threads 405 of bore body 406. Adjustment screw 34 has a central bore 42 in which is disposed a push rod 26 having an adjustment screw 28 at its top end. Adjustment screw 28 has a head 30 which is engaged in a recess 32 of bellows 24. A trim spring 44 is disposed about push rod 26 within adjustment screw 34. Trim spring 44 engages the cross bore 38 at the top of adjustment screw 34 and engages dual mode disk 70 at its bottom end. In this embodiment, a force transmission assembly is formed by adjustment screw 28, push rod 26, adjustment screw 34, trim spring 44, dual mode disk 70, and dual mode spring 82 to transmit forces between bellows 24 and piston 60. A pressure relief passageway is formed by central bore 68 in piston stem 62, counterbore 66 of piston 60, hole 78 in dual mode disk 70, central bore 46 of push rod 26, cross bore 48 of push rod 26, and cross bore 38 of adjustment screw 34. Body tube 20 may have a plurality of access holes 40 that allow access to cross bore 38 of adjustment screw 34. Access holes 40 also allow adjustment of the depth of engagement between adjustment screw 28 and push rod 26.

Referring again to FIGS. 24-27, piston 60 has a countersink 64 for receiving dual mode disk 70. As discussed above, piston 60 has a groove 58 for receiving an O-ring 56 for sealing engagement with regulator bore 425 of bore body 406 (see FIGS. 63 and 64). Stem 62 of piston 60 has a central bore 68 that communicates with a counterbore 66 which is formed in main piston body 65. Dual mode disk 70 has a shoulder 72 for resting atop piston 60. The bottom 74 of dual mode disk 70 has a hole 78 which communicates with recess 76.

The operation of regulator assembly 400 is much like that of assembly 300 described above, except that the segmented pressure versus temperature performance illustrated in FIG. 33 is provided by the dual mode disk 70 and retaining ring 80 rather than the shoulder 336 and adjustment screw 34 described above. In the first operating condition corresponding to segment BC of the pressure versus temperature curve in FIG. 33, the combination of the force $F_W$ generated by power element 148 due to the relatively higher temperature of the water (which is transmitted to piston 60 from bellows 24 through adjustment screw 28, push rod 26, and dual mode disk 70) plus the force $F_{TS}$ of trim spring 44 is greater than the force $F_{DMS}$ generated by dual mode spring 82. Thus, dual mode disk 70 is seated against piston 60 and is not engaged with retaining ring 80. In this condition, the downward forces $F_W$ and $F_{TS}$ acting on piston 60 are balanced by a combination of upward forces, namely, a force $F_G$ due to the pressure of the $CO_2$ gas acting on face 240 of piston 60 and a force $F_{PS}$ generated by poppet spring 320 which is transmitted to stem 62 of piston 60 through poppet 100. The force balance in this condition is such that stem 62 has depressed pad 102 of poppet 100 out of engagement with sealing face 195 of orifice insert 90, and therefore $CO_2$ gas is allowed to flow through regulator 412 as described above in connection with FIG. 42 for regulator 312.

In a second operating condition for regulator assembly 400, which corresponds to segment AB of the pressure versus temperature curve in FIG. 33, the force $F_W$ generated by power element 148 due to the relatively lower temperature of the water has decreased such that the combination of the force $F_W$ plus the force $F_{TS}$ of trim spring 44 is less than the force $F_{DMS}$ generated by dual mode spring 82. Thus, dual mode disk 70 is pressed upward into engagement with retaining ring 80 and is not engaged with piston 60. In this condition, the force balance is such that stem 62 has depressed pad 102 of poppet 100 out of engagement with sealing face 195 of orifice insert 90, and therefore $CO_2$ gas is allowed to flow through regulator 412 as described above in connection with FIG. 43 for regulator 312. In operation, as the water temperature decreases from some point along segment BC of FIG. 33, this second condition will first be reached when the water temperature cools to temperature $T_2$ at point B, which is when dual mode disk 70 first comes into engagement with retaining ring 80. So long as the water temperature remains below $T_2$, retaining ring 80 will prevent further upward travel of disk 70, and the pressure at outlet 384 will remain constant at the selected pressure $P_1$.

In a third operating condition for regulator assembly 400, $CO_2$ gas is allowed to be released if the pressure at the outlet 384 has become too great for the given water temperature. Once again, such a condition may be realized if, for example, the water temperature has decreased over a period of time during which the associated dispensing unit has not been used to dispense any carbonated beverages. In this third operating condition, the $CO_2$ gas pressure acting on face 240 of piston 60 is sufficient to push piston 60 upward such that dual mode disk 70 is sandwiched into engagement with both retaining ring 80 and piston 60, and stem 62 is thereby lifted off of pad 102 of poppet 100, which allows excess $CO_2$ gas to escape upward through central bore 68 of piston stem 62 and through central bore 46 of push rod 26, and finally outward through cross bores 48 and 38 and access holes 40. This relieving gas flow will continue until a state of equilibrium is reached, at which point stem 62 will again be seated on pad 102. Such a state of equilibrium is illustrated in FIG. 63.

As persons of ordinary skill in the art will appreciate, regulator assembly 400 thus provides a means of controlling the pressure of carbon dioxide at outlet 384 in response to the temperature of the water in temperature sensor 15. In one embodiment, regulator assembly 400 is designed to perform according to a curve ABC as illustrated in FIG. 33 as discussed above for assembly 300. To achieve such performance, an Invensys RAS-16673 power element 148 may be employed to provide a force of 9.25 lb. at the 55° F., 57 psi condition and a force of 16.3 lb. at the 88° F., 105 psi condition. With a force difference $\Delta_F$=16.3 lb.-9.25 lb.=7.05 lb. and a pressure difference $\Delta_P$=105 psi-57 psi=48 psi, the cross-sectional area of face 240 of piston 60 may be sized at $A=\Delta_F/\Delta_P=7.05/48=0.1469$ in², which corresponds to a diameter of 0.432 in. Once again, the foregoing piston sizing may be adjusted to account for the area taken up by stem 62. In this embodiment, the springs of regulator 412 may be sized as follows:

poppet spring 320 having a spring constant of 3.1 lb./in.;
trim spring 44 having a spring constant of 4.3 lb./in.;
dual mode spring 82 having a spring constant of 131.3 lb./in.; and
diaphragm spring 318 having a spring constant of 7.1 lb./in.

With the above sizing, poppet spring 320 provides a force of 1.14 lb. when poppet 100 is in closed engagement with orifice insert 90, trim spring 44 provides a force of 0.26 lb. when dual mode disk 70 is engaged with retaining ring 80, dual mode spring 82 provides a force of 10.28 lb. when dual mode disk 70 is seated in piston 60, and diaphragm spring 318 provides a force of 1.73 lb. when diaphragm 308 is in closed engagement with sealing surface 396. Again, the particular sizing and values set forth above are by way of illustration only and are not limiting to the present invention.

C. Diaphragm Configuration

Figure 65:
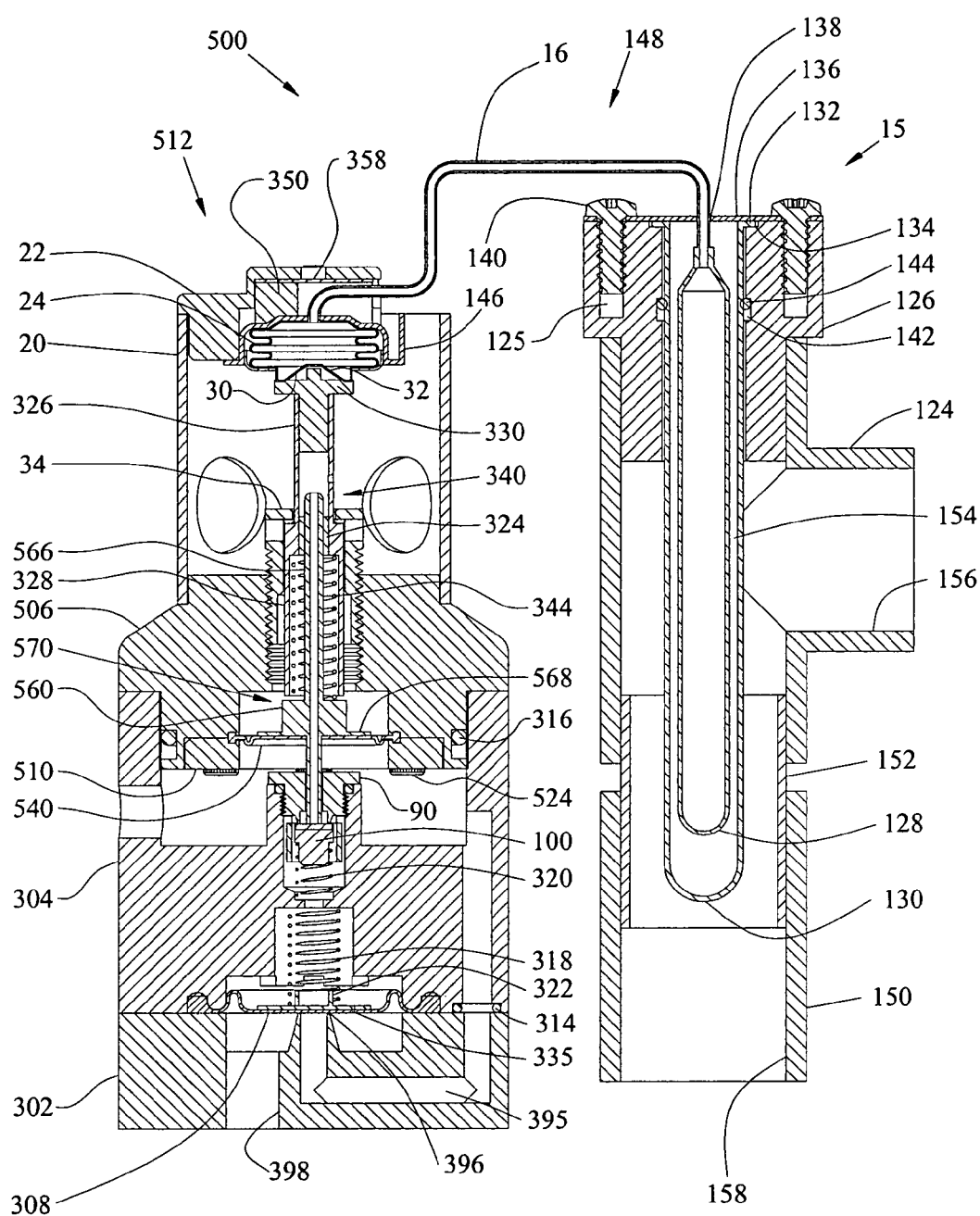
FIG. 65 is a cross-sectional view of still another embodiment of a pressure regulator assembly.
Figure 66:
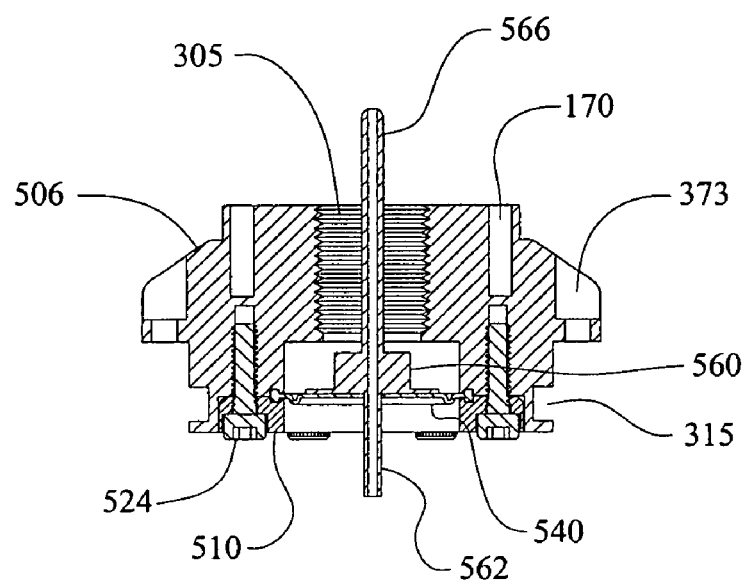
FIG. 66 is an enlarged cross-sectional view of the force transmission diaphragm assembly of the pressure regulator of FIG. 65.
Figure 67:
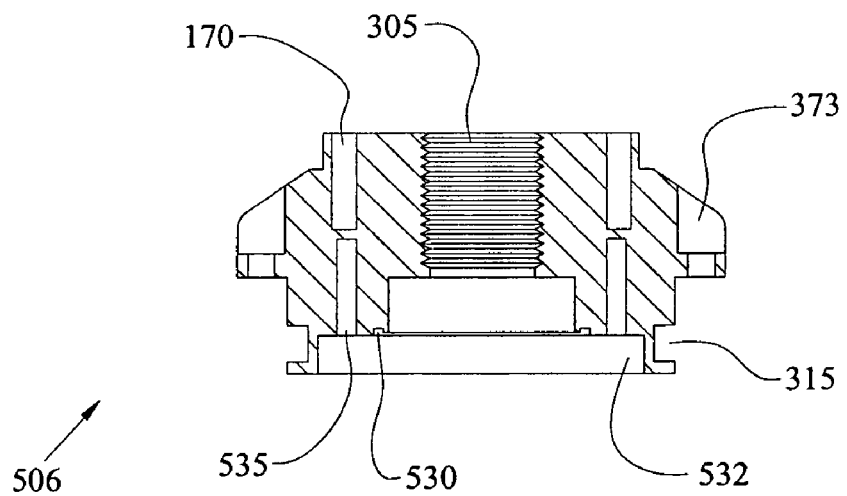
FIG. 67 is an enlarged cross-sectional view of the diaphragm housing of FIG. 66.
Figure 68:
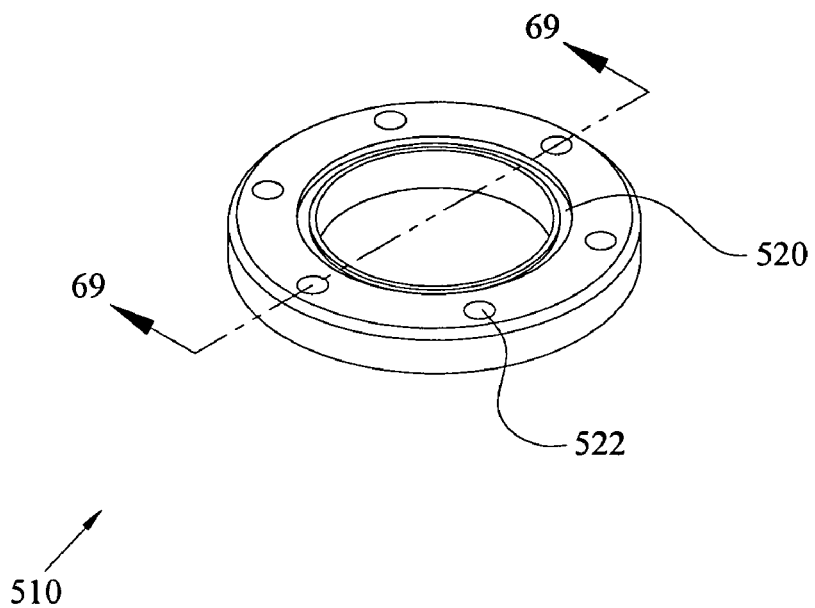
FIG. 68 is a perspective view of the retainer disk of FIG. 66.
Figure 69:
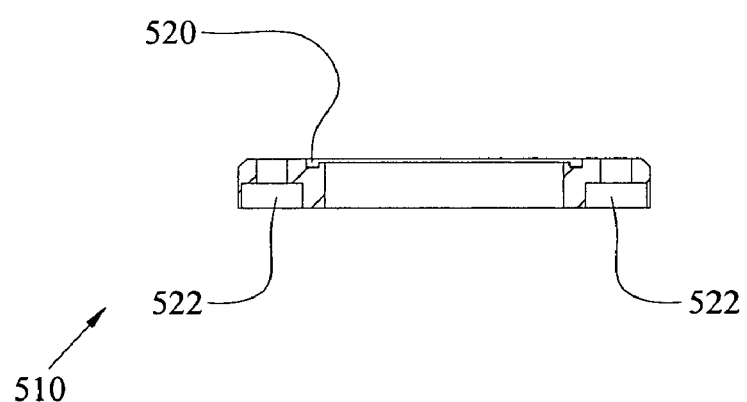
FIG. 69 is a cross-sectional view of the retainer disk of FIG. 68 taken in the direction of arrows 69-69.
Figure 70:
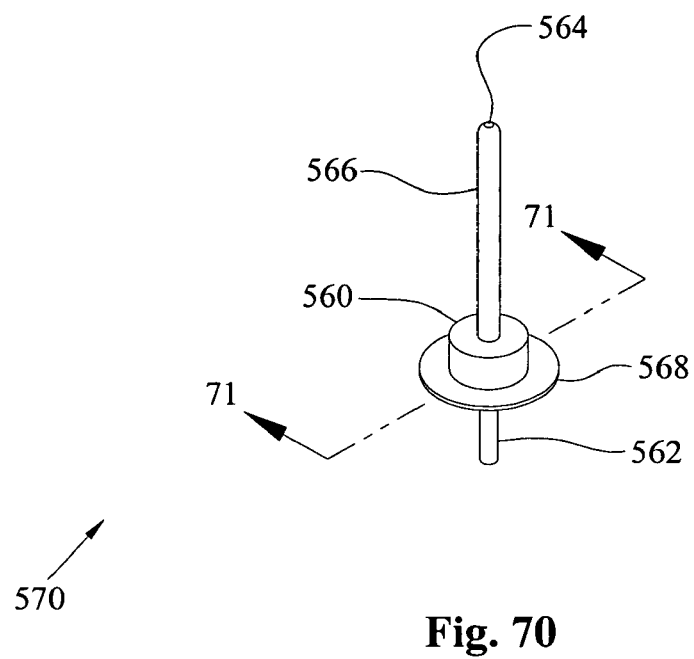
FIG. 70 is a perspective view of the secondary force transmission tube of FIG. 65.
Figure 71:
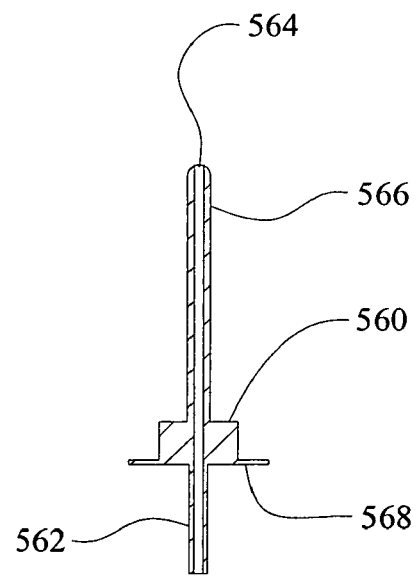
FIG. 71 is a cross-sectional view of the secondary force transmission tube of FIG. 70 taken in the direction of arrows 71-71.

Referring now to FIG. 65, another alternative pressure regulator assembly 500 is shown having a pressure regulator 512 and a temperature sensor 15. Pressure regulator assembly 500 is much like pressure regulator assembly 300 described above, except that pressure regulator 512 has a diaphragm 540 instead of a piston to serve as a pressure reacting member. Diaphragm 540 may be installed in a regulator body 506, which mates with outlet body 304 and body tube 20 in like manner as bore body 306 discussed above. Referring also to FIGS. 66 through 69, diaphragm 540 may be seated in a groove 530 provided in body 506 and held in place by a retainer 510, which fits into a recess 532 provided in body 506. Retainer 510 may have a groove 520 for receiving diaphragm 540. Retainer 510 may be secured to body 506 with a plurality of screws 524 installed through holes 522 and 535. Body 506 may have a threaded recess 305 for receiving adjustment screw 34. A stabilizer 570, which is shown separately in FIGS. 70 and 71, may be fixed to the upper side of diaphragm 540. Stabilizer 570 has a base 568 for attachment to diaphragm 540, a boss 560 for engagement with spring 344, an upper stem 566 for engagement with bushing 324 of force transmission tube assembly 340, a lower stem 562 for engagement with pad 102 of poppet 100, and a central passageway 564 to allow relief of excess $CO_2$ gas. Persons of skill in the art will recognize that pressure regulator assembly 500 operates in a similar manner as assembly 300 discussed above, except that the pressure of the $CO_2$ gas acts on the diaphragm 540 instead of the piston 360, and the spring 344 acts on stabilizer 570 instead of piston 360.

D. Bellows Configuration

Figure 72:
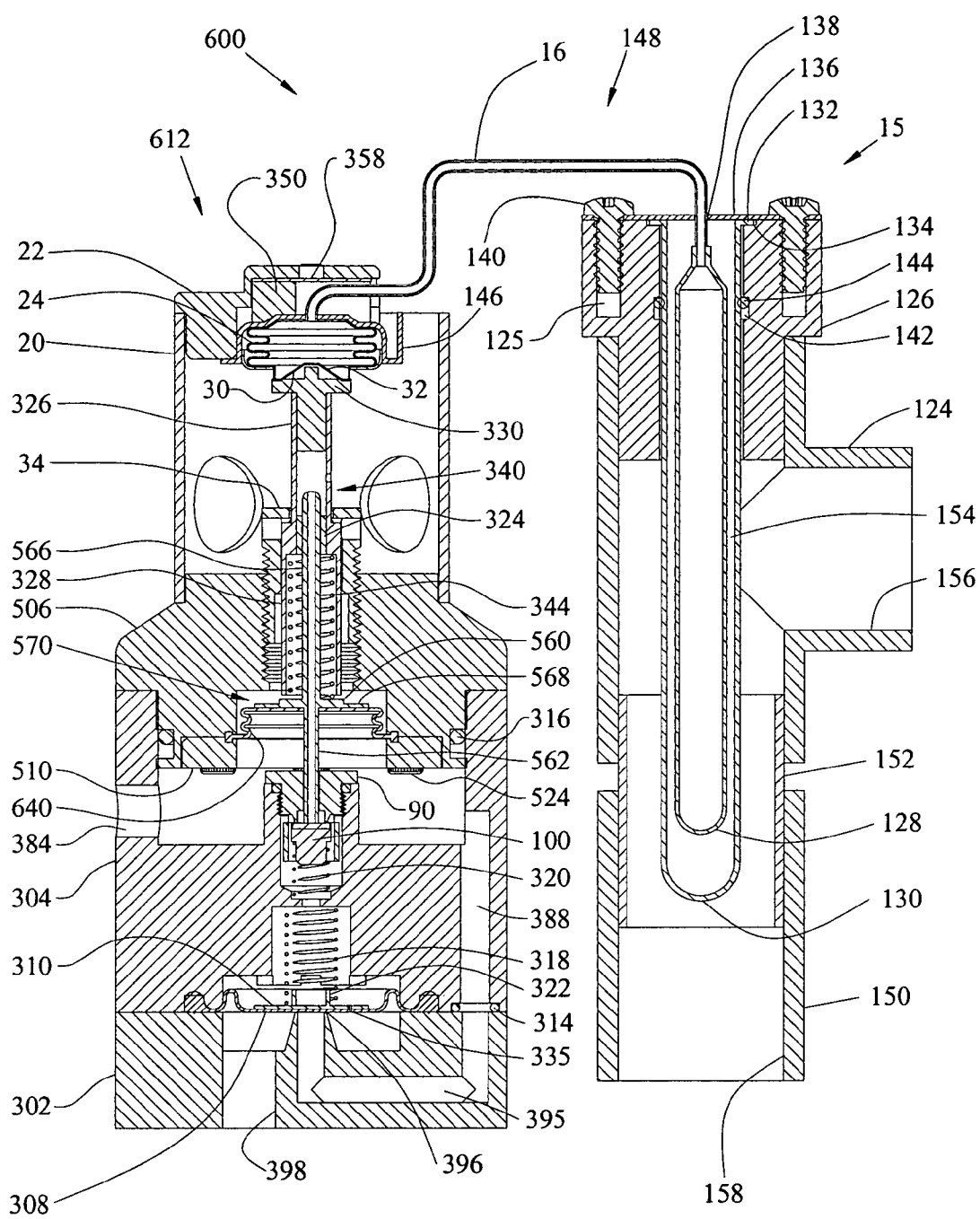
FIG. 72 is a cross-sectional view of yet another embodiment of a pressure regulator assembly.

Referring now to FIG. 72, still another alternative pressure regulator assembly 600 is shown having a pressure regulator 612 and a temperature sensor 15. Pressure regulator assembly 600 is the same as pressure regulator assembly 500 described above, except that pressure regulator 612 has a bellows 640 instead of a diaphragm 540 to serve as a pressure reacting member. In pressure regulator 612, the stabilizer 570 is shown having a shorter boss 560 (see FIGS. 70 and 71) for the sake of compatibility with the same regulator body 506. Again, persons of skill in the art will recognize that pressure regulator assembly 600 operates in a similar manner as assembly 300 discussed above, except that the pressure of the $CO_2$ gas acts on the bellows 640 instead of the piston 360, and the spring 344 acts on stabilizer 570 instead of piston 360.

Figure 73:
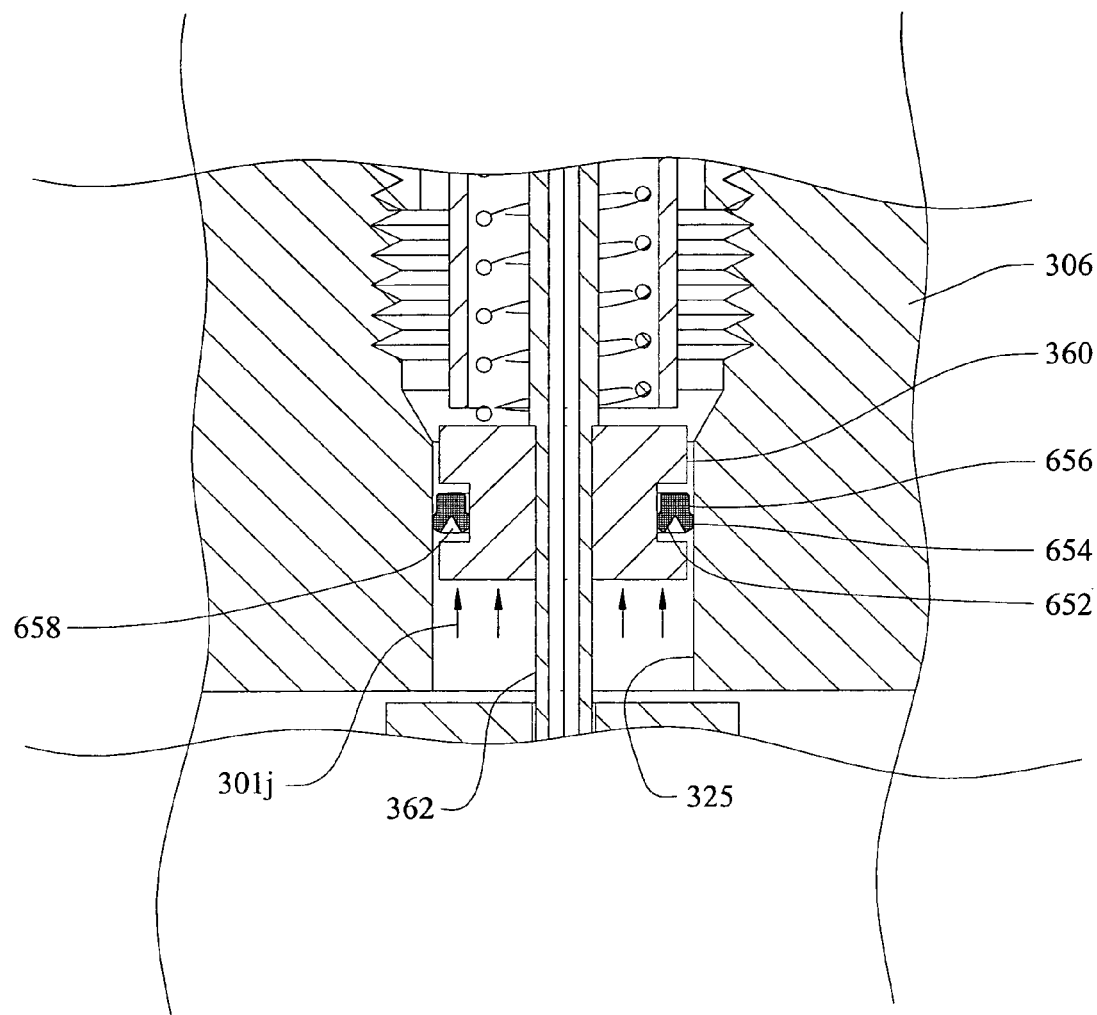
FIG. 73 is a cross-sectional view of an alternative piston sealing arrangement.

For any of the above embodiments having a piston, the performance of the pressure regulator assembly may be improved by using a U-cup seal instead of an O-ring for the interface between the piston and the bore in which the piston resides. Suitable U-cup seals are available from Parker Hannifin Corporation, 2220 South 3600 West, Salt Lake City, Utah 84119. Referring to FIG. 73, a U-cup seal 656 is shown installed in a groove of piston 360, which resides in bore 325 of bore body 306. U-cup seal 656 has a recess 658 formed between an inner leg 652 and an outer leg 654. Recess 658 faces downward such that the upward pressure of the $CO_2$ gas as indicated by arrows 301*j* tends to press outer leg 654 into engagement with bore 325 to form a movable seal between piston 360 and bore 325. This design enables an effective seal to be formed between piston 360 and bore 325 with a lower compressive force than an O-ring, which relies on the compression of an interference fit in order to form a seal. With U-cup seal 656, piston 360 is thus able to slide in bore 325 with less friction than would be created by an O-ring, which makes the pressure regulator more efficient and yields lower pressure losses.

As used herein, the term "dual mode disk" means any relatively stiff structure capable of reacting opposing forces and undergoing movement in response to those forces. Although members 26 and 326 have been shown and described above as tubes having a central passageway through which excess pressure may be relieved, persons of reasonable skill in the art will appreciate that members 26 and 326 may simply be rods for the purpose of transmitting force from the bellows 24 to the pressure reacting member, either directly or indirectly through one or more intermediate members, such as a spring or a dual mode disk. Persons of ordinary skill in the art will also recognize that although temperature sensor 15 has been described above as comprising a fluid-filled bulb communicating with a bellows through a conduit, any suitable temperature sensor may be employed, such as a thermostat or a thermistor that actuates a solenoid or lead screw to transmit force to the valve. Thus, as used herein, the term "temperature sensor" should be understood to mean any device or combination of devices that is capable of producing a force in response to a change in temperature. The term "proximity" as used herein means near but not necessarily in contact. The term "pressure reacting member" as used herein means any structure that is capable of reacting pressure from a gas and undergoing movement in response to such pressure. The term "force transmission assembly" as used herein means any structure, whether of one component or multiple components, that is capable of transmitting force between two or more objects.

Additionally, although embodiments have been described above for controlling pressure according to a two-segment pressure versus temperature curve as shown in FIG. 33, persons of ordinary skill in the art will appreciate that other embodiments may be designed to perform according to more complex pressure versus temperature curves. For example, more than one power element may be used such that each power element provides a different range of forces and thereby causes a different slope on the pressure versus temperature curve over a particular range of water temperatures. Alternatively, more than one dual mode disk may be employed to achieve more than one flat, constant pressure segment in the pressure versus temperature curve. For example, pressure regulator 12 of FIG. 2 may be modified to include a second dual mode disk above retaining ring 80 and an additional spring between the two dual mode disks, and push rod 26 would bear on the upper dual mode disk rather than the lower dual mode disk. Such an alternative embodiment may be employed to perform according to a pressure versus temperature curve having a first constant pressure segment in a lower temperature range, a substantially linear segment in an intermediate temperature range, and a second constant pressure segment in an upper temperature range which occurs when the upper dual mode disk engages the retaining ring. Such an alternative embodiment may be desirable, for example, to provide an upper limit on the operating pressure if the pressure regulator is used as the primary regulator from a very high pressure source instead of being used as a secondary regulator after the pressure has been stepped down by a primary regulator.

Although the foregoing specific details describe certain embodiments of this invention, persons reasonably skilled in the art will recognize that various changes may be made in the details of this invention without departing from the spirit and scope of the invention as defined in the appended claims. Therefore, it should be understood that this invention is not to be limited to the specific details shown and described herein.

We claim:

1. A pressure regulator assembly for controlling the pressure at which carbon dioxide gas is introduced into water in a carbonated beverage system, said pressure regulator assembly comprising:
   (A) a temperature sensor comprising
      a hollow body having a fluid therein,
      said hollow body being positionable in proximity to the water to facilitate heat transfer between the water and said fluid,
      said fluid communicating between said hollow body and a bellows; and
   (B) a pressure regulator comprising
      an inlet for receiving the carbon dioxide gas,
      an outlet for releasing the carbon dioxide gas to be introduced to the water,
      a first flow path providing gas flow communication between said inlet and said outlet,
      said first flow path having a first gas flow capacity,
      a first valve adaptable for regulating flow through said first flow path,
      a second flow path providing gas flow communication between said inlet and said outlet,
      said second flow path having a second gas flow capacity,
      said second gas flow capacity being greater than said first gas flow capacity,
      a second valve adaptable for regulating flow through said second flow path,
      a pressure reacting member on which said carbon dioxide gas may act, and
      a force transmission assembly operatively engaged between said bellows and said pressure reacting member;
   wherein said first valve is adjustable in response to movement of said pressure reacting member;
   wherein said second valve is adjustable in response to movement of said first valve; and
   wherein the pressure of the carbon dioxide gas at said outlet varies in response to a change in temperature of the water over a first range of water temperatures.

2. The pressure regulator assembly of claim 1 wherein said pressure reacting member is selected from the group consisting of piston, diaphragm, and bellows.

3. The pressure regulator assembly of claim 1 wherein said force transmission assembly comprises at least one spring.

4. The pressure regulator assembly of claim 1 wherein the pressure of the carbon dioxide gas at said outlet remains substantially constant over a second range of water temperatures.

5. The pressure regulator assembly of claim 1 wherein the pressure of the carbon dioxide gas at said outlet may be relieved in response to a decrease in the temperature of the water.

6. The pressure regulator assembly of claim 1 wherein the pressure of the carbon dioxide gas at said outlet varies substantially linearly over said first range of water temperatures.

7. The pressure regulator assembly of claim 1 wherein said first valve comprises an orifice and a poppet adaptable for opening and closing said orifice.

8. The pressure regulator assembly of claim 7 further comprising a spring for biasing said poppet toward closing engagement with said orifice.

9. The pressure regulator assembly of claim 1 wherein said second valve comprises a diaphragm adaptable for opening and closing a passageway.

10. The pressure regulator assembly of claim 9 further comprising a spring for biasing said diaphragm toward closing said passageway.

11. A pressure regulator assembly for controlling the pressure at which carbon dioxide gas is introduced into water in a carbonated beverage system, said pressure regulator assembly comprising:
   a temperature sensor responsive to the temperature of the water; and
   a pressure regulator operatively connected to said temperature sensor, said pressure regulator comprising:

an inlet for receiving the carbon dioxide gas, an outlet for releasing the carbon dioxide gas to be introduced to the water, a first flow path through which the carbon dioxide gas may flow from said inlet to said outlet, a first valve adaptable for regulating flow of the carbon dioxide gas through said first flow path, a second flow path through which the carbon dioxide gas may flow from said inlet to said outlet, and a second valve adaptable for regulating flow of the carbon dioxide gas through said second flow path;

wherein said first valve is responsive to a change in temperature of the water; and wherein said second valve is responsive to a change in pressure of the carbon dioxide gas resulting from movement of said first valve.

12. The pressure regulator assembly of claim 11 wherein the pressure of the carbon dioxide gas at said outlet varies substantially linearly in response to a change in temperature of the water over a first range of water temperatures, and wherein the pressure of the carbon dioxide gas at said outlet remains substantially constant over a second range of water temperatures.

13. The pressure regulator assembly of claim 11 wherein said temperature sensor comprises:

a hollow body having a fluid therein;

said hollow body being positionable in proximity to the water to facilitate heat transfer between the water and said fluid;

said fluid communicating between said hollow body and a bellows;

wherein said bellows is operable to transmit force to said first valve.

14. The pressure regulator assembly of claim 13 wherein said pressure regulator further comprises:

a pressure reacting member on which the carbon dioxide gas may act, said pressure reacting member being operatively engaged with said first valve; and a force transmission assembly operatively engaged between said bellows and said pressure reacting member.

15. The pressure regulator assembly of claim 14 wherein said pressure reacting member is selected from the group consisting of piston, diaphragm, and bellows.

16. The pressure regulator assembly of claim 14 wherein said force transmission assembly comprises:

a rod engaged with said bellows; and a spring engaged with said rod and said pressure reacting member;

wherein travel of said rod is limited such that the pressure of the carbon dioxide gas at said outlet varies substantially linearly in response to a change in temperature of the water over a first range of water temperatures, and wherein the pressure of the carbon dioxide gas at said outlet remains substantially constant over a second range of water temperatures.

17. The pressure regulator assembly of claim 16 wherein said rod comprises a passageway through which excess pressure of the carbon dioxide gas may be relieved.

18. The pressure regulator assembly of claim 11 wherein:

said first valve comprises an orifice and a poppet adaptable for opening and closing said orifice; and said second valve comprises a diaphragm adaptable for opening and closing said second flow path.

19. The pressure regulator assembly of claim 11 wherein:

said first flow path has a first gas flow capacity;

said second flow path has a second gas flow capacity; and said second gas flow capacity is greater than said first gas flow capacity.

* * * * *